United States Patent
Ge

(10) Patent No.: US 9,292,959 B2
(45) Date of Patent: Mar. 22, 2016

(54) MULTI-DIMENSIONAL STACKING WITH SELF-CORRECTION

(71) Applicant: Digizig Media Inc., Waterloo (CA)

(72) Inventor: Renyan Ge, Waterloo (CA)

( * ) Notice: Subject to any disclaimer, the term of this patent is extended or adjusted under 35 U.S.C. 154(b) by 385 days.

(21) Appl. No.: 13/894,178

(22) Filed: May 14, 2013

(65) Prior Publication Data

US 2014/0035904 A1    Feb. 6, 2014

Related U.S. Application Data

(60) Provisional application No. 61/647,710, filed on May 16, 2012.

(51) Int. Cl.
*G06T 15/00* (2011.01)
*H04N 9/31* (2006.01)

(52) U.S. Cl.
CPC .............. *G06T 15/00* (2013.01); *H04N 9/3147* (2013.01); *H04N 9/3185* (2013.01); *H04N 9/3194* (2013.01)

(58) Field of Classification Search
None
See application file for complete search history.

(56) References Cited

U.S. PATENT DOCUMENTS

2013/0093805 A1* 4/2013 Iversen .......................... 345/690
2014/0192076 A1* 7/2014 Tan et al. ...................... 345/582

* cited by examiner

*Primary Examiner* — Zhengxi Liu

(57) ABSTRACT

A method and apparatus comprises a combination of four-dimensional image stacking methods and self-correction features. An input frame in a sequence is modified into multiple subimages with multiple subregions, where there is one and only one subregion in every subimage contains the higher frequency information of the original input frame than the same subregion in all other subimages; each of the subimages is sent to a device of a stacked display system; the sequence of displayed frames is further modified into pairs for temporal stacking. The result is equal or considered better than the original quality. By equipped with sensor based negative feedback processes and correction algorithms, it provides new ways to fast calibration or constantly and continuously self-correction to the display system non-uniformities, including brightness, registration, etc., and all behind the scene during the normal show playing or image presentation therefore unnoticeable to audience.

20 Claims, 16 Drawing Sheets

MULTI-DIMENSIONAL STACKING WITH SELF-CORRECTION

CROSS-REFERENCE TO RELATED APPLICATIONS

This application claims the benefit of U.S. Provisional Patent Application No. 61/647,710, filed May 16, 2012. The entire disclosure of the above application is incorporated herein by reference.

FIELD

The present disclosure relates to the field of digital image processing and electronic display system.

BACKGROUND

Giant screen projection delivers immersive experience people cannot get from other ordinary displays. Dome type of projection provides even larger field of view and a virtual reality feeling. But all the craving for visual dimension expansion comes with a squarely increased requirement of projector brightness. No matter for the latest Xeon based traditional DLP projector or the upcoming powerful laser light engine based projectors, stacking two or more projectors can always be a simple, efficient and cheaper way to achieve a brighter projection.

Stacking projection is overlapping two or more projectors' images substantially onto a common display surface. In a traditional stacked projection for 2D display, each projector displays an exact same image; and the stacking occurs only in one dimension which is normal to the display surface. The substantial part of each projected image is added up to produce a desired final image. The final image can have increased brightness and largely reduced screen door effect of a given native projector resolution, but it also requires very accurate sub-pixel inter-projector registration and significant effort for maintaining such registration to achieve the comparable image sharpness and quality as that from a single projector setup.

Registration is normally achieved by warping one image to match another image. During the warping, the pixels are digitally resampled from the original image by using a digital filter. When and in most of time, the new pixel is sampled between adjacent non-fractional pixels, based on Nyquist-Shannon sampling theorem, the maximum frequency information can be possibly represented in the resampled image is the half of the maximum discreet sampling frequency of the original image; that is, if there is a sharp one-pixel width line in original image, now it becomes a two-pixel blurred line in the warped image. So registration by warping will generally degrade image quality. Considering the complete variety of the image content, even with a perfect alignment mapping knowledge, the best possible image registration can be achieved by digital warping is 0.5 pixels.

In practice, the above theoretical best possible registration is impossible to get. Because alignment mapping knowledge is imperfect. (1) first, the registration and its calibration accuracy would suffer from system and measurement errors. A common way of registration calibration for a stacking system is using a camera system to capture geometry locations of a set of control points. Then calculate the geometrical mapping between control points in image and that on screen. The common error of this process arises from camera noise and its lower capturing resolution; and other errors are seen from the interpolation based estimation of mappings for other non-control point pixels. (2) Second, thermal drifting and aging arises from optical components, light engine components, electronic and mechanical parts may also cause registration calibration shift continuously and constantly over time. The drifting and aging is very non-uniform and unpredictable. Besides the common way of calibration is a separate process that needs a set of stricter testing conditions, e.g. complete dark without stray lights, and exclusive access of the complete projection system for a period of time; for example, it takes minutes to display a sequence of specially designed test pattern images. This means a calibration is inappropriate to be executed during a show or even more than once during a day. Therefore the registration changes are not captured and followed by the projection system. The larger registration errors can be seen as result of degraded images at the end of day. (3) Lastly the thermal, mechanical and environmental factors caused system component vibration makes very accurate registration almost impossible. For example, each projector may be affected by exhaust air or vent fan and sub-woofer from audio system differently, therefore may vibrate at different magnitudes, frequencies and phases. The relative position of every pixel from each projector becomes almost unpredictable. A vibration pattern was observed and measured in a typical 2K system could be up to 4 pixels within a second.

For 4K and higher resolution digital cinema projection, the above mentioned three kinds of difficulties for achieving very accurate registration become even more difficult if it not impossible. A 4K or higher resolution system is at least 4 times finer pixel size than 2K system; this requires even higher calibration measurement accuracy. Registration drifting and component aging caused image quality degradation would be much more sensitive. And the projector vibration would affect more pixels if other factors remain the same. If these problems can not be solved properly for a stacked projection, migrating to 4K or higher resolution projector is pointless and a waste of effort because it will not deliver the improved image quality as expected.

Even for other low end projection system, like home theaters, office presentation, etc. consumer applications, the resolution is 2K or less, but the calibration process needs to have less stringent requirements; hardware aging and drifting could be larger; there could be more factors in environment cause unpredictable vibration or change. Those also make alignment and maintaining alignment of a low end 2K or less resolution system difficult.

Besides registration, brightness uniformity is also a common problem of stacking projection but seldom being addressed. (1) Non-uniform brightness may arise between projectors, that is, one projector has different brightness or color than the other projector. This imposes a problem of inconsistent or incorrect color for even a traditional stacked projection which each projector displays the exactly same image. The pixel color in the final super-imposed image becomes a function of brightness of each color component of each projector. That is, for any two pixels having same color (hue) but different luminance in the original image or if two projectors have same brightness, now they are having different color (hue) because two projectors have different brightness. (2) Non-uniform brightness may also occur within one projector, that is, within single projected image, the peak brightness for each pixel is not uniform and following a distribution; and even worse, this distribution is changing frequently over time due to the same reasons of previous registration drifting from thermal uneven, light engine aging and optical mechanical movement. This kind of non-uniformity cause even more image degradation by introducing in-image vignetting, color shifting and inconsistent contrast/brightness.

To address all those problems mentioned above for a general stacking projection, a new method and efficient system is in need to be invented. The new method and system should not only be able to achieve fast, high accuracy brightness and registration calibration and correction, but also can easily, continuously and constantly monitor, update and maintain the existing calibration at low cost. The new method and system should also be largely immune to or tolerate most projection system random vibration and calibration errors.

SUMMARY

The disclosure presents a novel method and apparatus comprising a combination of multiple image stacking methods in spatial and temporal four dimensions, including stacking in 2D image domain, stacking among multiple projectors and stacking in time domain and a self-correcting feature. An input image in a sequence is initially modified into different sub-regions for 2D spatial stacking, where at least one sub-region contains the greater amount of high frequency band information of the original image than all other sub-regions; the image is further modified into multiple different sub-images for the $3^{rd}$ dimension spatial stacking among projectors, where there is one and only one sub-region in any sub-image contains the higher frequency band information of the original image than the same sub-region in all other sub-images; the sequence of images is further modified into pairs of different sub-frames for temporal stacking, where within at least one sub-region, the pair of sub-frames use the opposite projector spatial stacking methods, i.e. sub-images are swapped between projectors. The result of the new stacked projection is equal or considered better than the original image and video quality. The system becomes not only more tolerable against various system imperfections and calibration errors, e.g. projectors' misalignment and non-uniform brightness; but also more secure in terms of anti-piracy because each sub-image transmitted and displayed by each projector is basically unwatchable. It is even secure and beneficial if multiple servers or image sources setup is used, each image source stores and transmits a different unwatchable sub-image that contains only a portion of higher frequency original image details but statistically balanced among sub-images. The spatially reduced image detail in content helps the compression algorithms during storage and transmission to keep balanced or better image quality. Lastly the most important benefit of present disclosure is, by equipped with sensor based feedback processes and algorithms; it provides new ways to fast calibrate or continuously and constantly self-correct the calibration for both brightness uniformity and pixel registration to maintain and minimize the errors. The calibration and correction can happen behind the scene during the normal show playing or other image presentation without requiring explicit test patterns and calibration phases, therefore unnoticeable to audience.

DETAILED DESCRIPTION

Figure 1:
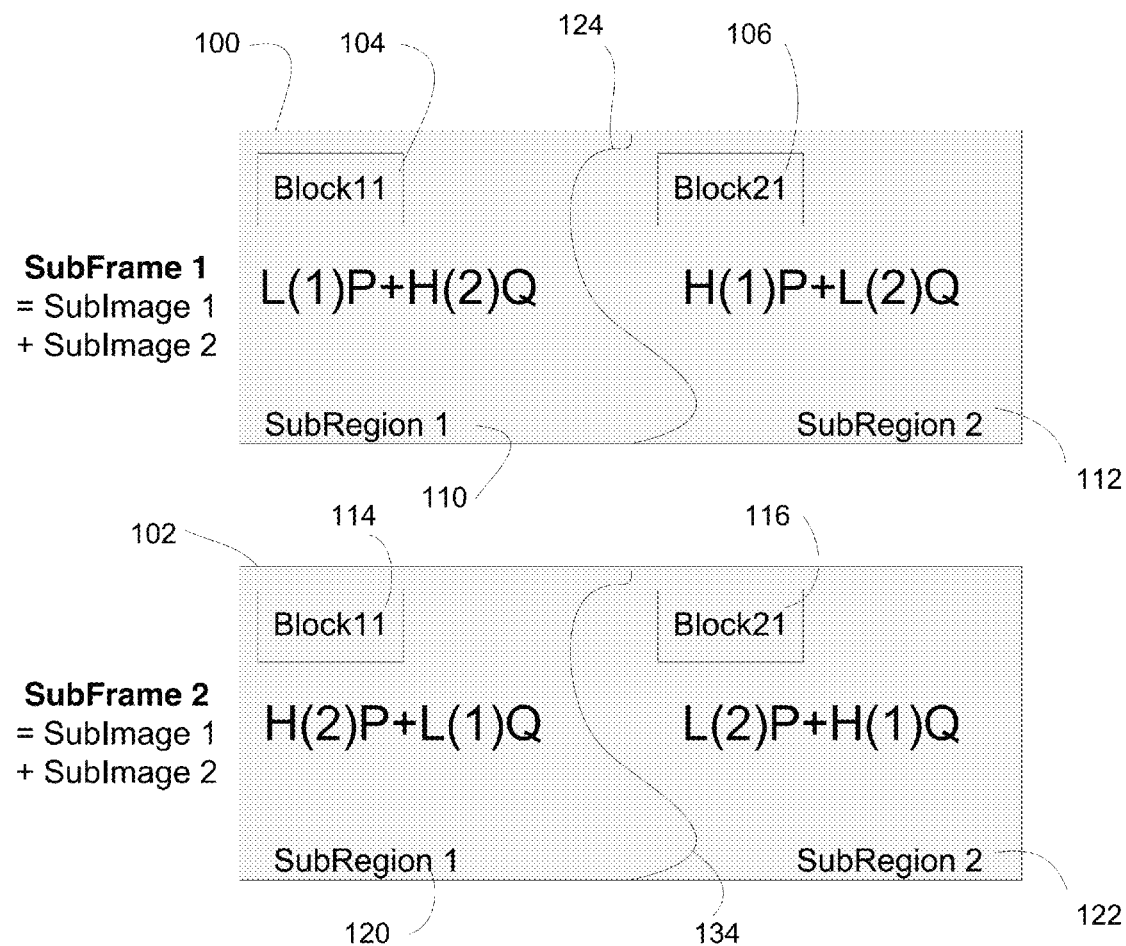
FIG. 1 illustrates the overall key components structure of a multi-dimensional stacking with self-correction.

The disclosure presents a novel method and apparatus comprising a combination of multiple image stacking methods in four spatial and temporal dimensions, including stacking in 2D image domain, stacking among multiple projectors and stacking in time domain, and a self-correcting feature. An input image in a sequence is initially modified into different sub-regions for 2D spatial stacking, where at least one sub-region contains the greater amount of high frequency band information of the original image than all other sub-regions; the image is further modified into multiple different sub-images for the $3^{rd}$ dimension spatial stacking among projectors, where there is one and only one sub-region in any sub-image contains the higher frequency band information of the original image than the same sub-region in all other sub-images; the sequence of images is further modified into pairs of different sub-frames for temporal stacking, where within at least one sub-region, the pair of sub-frames use the opposite projector spatial stacking methods, i.e. sub-images are swapped between projectors. The result of the new stacked projection is equal or better than the original image and video quality. The system becomes not only more tolerable against various system imperfections and calibration errors, e.g. projectors' misalignment and non-uniform brightness; but also more secure in terms of anti-piracy because each sub-image transmitted and displayed by each projector is basically unwatchable. It is even secure and beneficial if multiple servers or image sources setup is used, each image source stores and transmits a different unwatchable sub-image that contains only a portion of higher frequency original image details but statistically balanced among sub-images. The spatially reduced image detail in content helps the compression algorithms during storage and transmission to keep balanced or better image quality. Lastly the most important benefit of present disclosure is, by equipped with sensor based feedback processes and algorithms; it provides new ways to fast calibrate or continuously and constantly self-correct the calibration for both brightness uniformity and pixel registration to maintain and minimize the errors. The best of all, the calibration and correction can happen all behind the scene during the normal show playing or other image presentation, without requiring explicit test patterns and calibration phases, and therefore unnoticeable to normal audience.

The main idea behind the multi-dimensional stacking for self-correction is, by automatically deriving or feeding the different content from the original input image(s) for stacking together along different space-time dimensions for display, the different unnormalized or unbalanced system properties or characteristics will implicitly manifest themselves and therefore could be detected by a sensor and a system processor to conduct iterative negative feedback self-correction for better normalization and balance until system converges and reaches to a stable state with the optimized best image quality. Yet another key point during the multi-dimensional stacking and self-correction is that the difference manifested because of unnormalized or unbalanced system properties or characteristics is dynamically kept small or only detectable by sensor and processor but largely insensitive to human eyes due to psychovisual reasons utilized in the disclosure. For example, human eyes have largely reduced sensitive of brightness contrast at low spatial resolution or temporal resolution.

All future discussions in the present disclosure about methods and system designs can apply equally to two or more projectors projection systems. For sake of simplicity and without loss of generosity, an exemplary double projector stacking system is being used by default to describe the basic ideas behind the methods and system designs if it is not explicitly specified otherwise. To those ordinary skilled in the art, it is easy or trivial to extend the descriptions presented to another configuration or system that has more than two projectors.

FIG. 1 shows the overall key components structure of one exemplary embodiment of the multi-dimensional stacking with self-correction feature. Other variants of the structure with added or missed or rearrangement of some components could be also easily derived for those ordinary skilled in the art. The description here is for exemplary purpose but is not intended to be regarded as limited to those examples.

Temporal stacking occurs between any pair of different sub-frames namely the first sub-frame 100 and the second sub-frame 102 in time dimension. The two sub-frames are not necessarily different in terms of image content, but instead they are different in terms of the way they are formed, for example, the projector stacking method that will be described soon. In one embodiment of the present disclosure, the results of the first sub-frame 100 and the second sub-frame 102 are supposed to be identical to or considered better quality than the two original images to be played consequently at the desired frame rate of a regular show in a regular projection respectively. There are exceptions in other embodiments of the present disclosure will be described later in FIG. 14.

A projector stacking can be considered as one spatial stacking in the Z axis dimension which is normal to the 2D image plane. Each projector displays one 2D sub-image, the result of multi-projector stacking is the superposition of all such sub-images displayed by all projectors. For example, sub-frame 1 is the superposition of sub-image 1 and sub-image 2 of sub-frame 1; sub-frame 2 is the superposition of sub-image 1 and sub-image 2 of sub-frame 2. Assuming the average peak brightness of the first projector is P, and the average peak brightness of the second projector is Q; the sub-image to be displayed by the first projector is L, and the sub-image to be displayed by the second projector is H; then the result of projector stacking from the first projector and the second projector will be LP+HQ. Similarly, if the sub-image to be displayed by the first projector is H, and the sub-image to be displayed by the second projector is L; then the result of projector stacking from the first projector and the second projector will be HP+LQ.

Each sub-image is a result of another stacking in spatial dimensions. An image stacking can be considered as one spatial stacking in the X and Y axis dimension which is inside the 2D image plane. Each sub-image is divided into the first sub-region 110, 120 and the second sub-region 112,122 by the minimum energy boundary 124, 134. The minimum energy boundary 124 and 134 is calculated based on image content; so they are not necessarily identical between sub-frames but they are identical between sub-images for all projectors. Therefore each sub-region will have the exactly same shape and size and location coordinates within all sub-images of a certain sub-frame. If in the first sub-image of the first sub-frame, the first sub-region image is L(1), and the second sub-region image is H(1); then the complete first sub-image is L(1)+H(1). Similarly, if in the second sub-image in the first sub-frame, the first sub-region image is H(2), and the second sub-region image is L(2); then the complete second sub-image is H(2)+L(2). Therefore the result of the projector stacking of the first sub-frame will be L(1)P+H(1)P+H(2)Q+L(2)Q. Similarly, the result of the projector stacking of the second sub-frame will be H(2)P+L(2)P+L(1)Q+H(1)Q. (4) Each sub-region contains a group of image blocks 104, 106, 114, 116. Image blocks inside image sub-regions are to be used as a processing unit for registration and brightness calibration and analysis.

Block11 104 is the first block of the first sub-region inside the first sub-image and the second sub-image of the first sub-frame; Block21 106 is the first block of the second sub-region inside the first sub-image and the second sub-image of the first sub-frame; Block11 114 is the first block of the first sub-region inside the first sub-image and the second sub-image of the second sub-frame; Block21 116 is the first block of the second sub-region inside the first sub-image and the second sub-image of the second sub-frame. All image blocks with the same name will have the same image coordinates and shape and size in all sub-frames and/or sub-images. For example, block11 104 in sub-image 1 and sub-image 2 of sub-frame 1 has the same image coordinates and shape and size as block11 114 in sub-image 1 and sub-image 2 of sub-frame 2; block21 106 in sub-image 1 and sub-image 2 of sub-frame 1 has the same image coordinates and shape and size as block21 116 in sub-image 1 and sub-image 2 of sub-frame 2.

Figure 2:
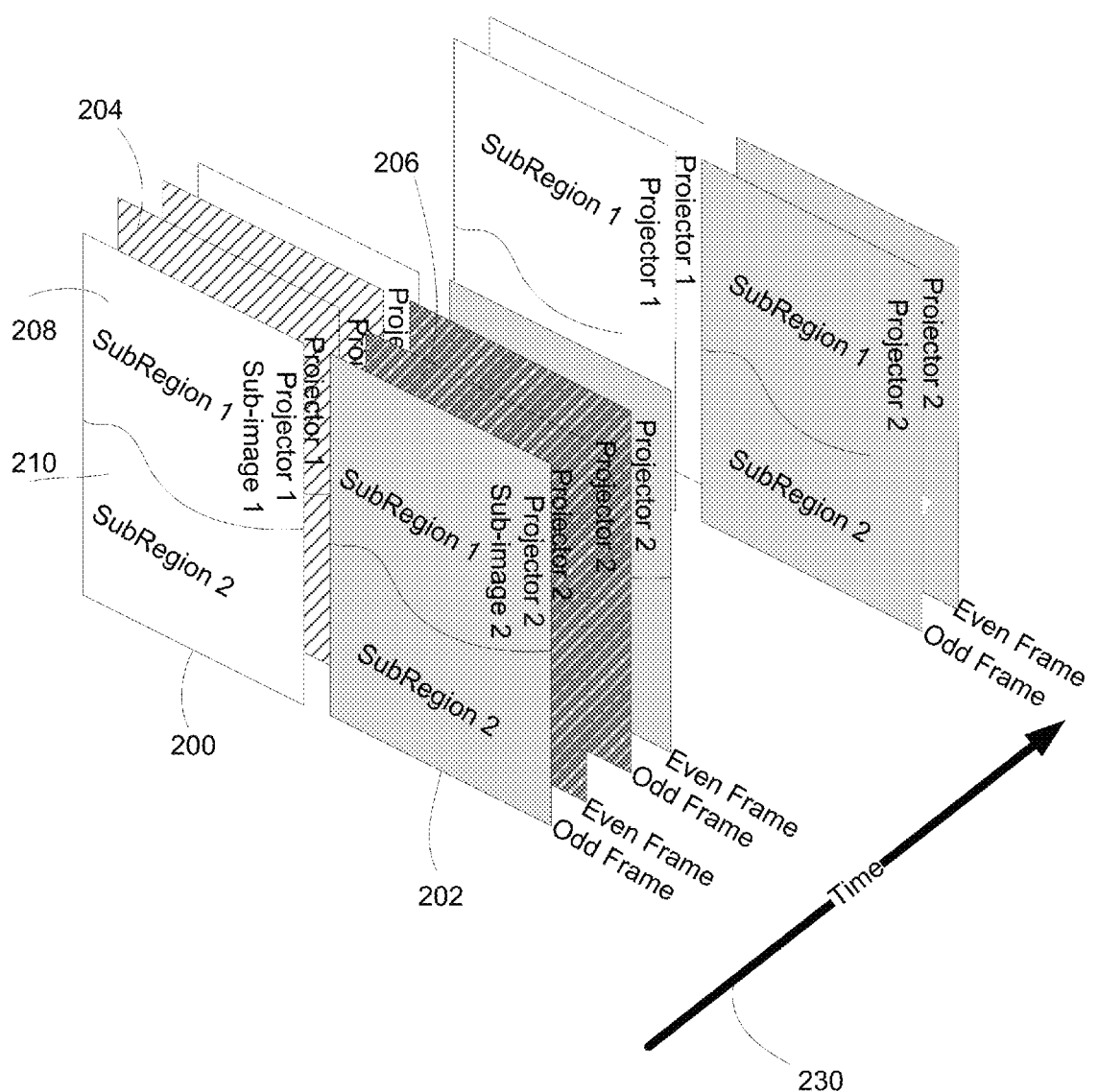
FIG. 2 illustrates the complete multi-dimensional stacking in a 3D intuitive way.

FIG. 2 shows one embodiment of the complete multi-dimensional stacking in a 3D intuitive way. Along the time axis 230, temporal frame stacking happens between odd sub-frames and even sub-frames, as shown in the different filling patterns. In one embodiment of the present disclosure a sub-frame can be constructed by the first projector stacking method to display the first sub-image to the first projector, and the second sub-image to the second projector; while in an alternative way, a sub-frame can also be constructed by the second projector stacking method to display the first sub-image to the second projector, and the second sub-image to the first projector. When temporal stacking is used, the two sub-frames must be constructed by the different projector stacking method described above. For example, when a temporal stacking is requested between the first pair of odd and even sub-frames from the left side in FIG. 2. The two sub-frames are painted in solid white and thatched lines respectively to indicate they are of different projector stacking methods. For example, if the first odd sub-frame with solid white is constructed by the first projector stacking method, then the second even sub-frame with thatched lines must be constructed by the second projector stacking method. If the next third odd sub-frame is not in the requested temporal frame stacking, so there is no change in the projector stacking method. The third odd sub-frame continues to be constructed by the second projector stacking method, i.e. also being painted in thatched lines; until the second temporal frame stacking is requested between the third odd sub-frame and the fourth even sub-frame. The construction of the fourth even sub-frame is toggled again back to the first projector stacking method, i.e. being painted in solid white again.

Further, within a projector stacking of one embodiment of the present disclosure, each projector is displaying one different sub-image. The final displayed image of the projection system is the superposition of all the projected sub-images. For example the first odd sub-frame is the superposition of the first sub-image 200 on the first projector and the second sub-image 202 on the second projector; the second even sub-frame is the superposition of the second sub-image 204 on the first projector and the first sub-image 205 on the second projector. In one embodiment of the present disclosure, all sub-images are derived from the original input image in a way that there is one and only one sub-region of each sub-image that contains the higher frequency band information of the original image than the same sub-region in all other sub-images. In other words, this requires the number of sub-regions in a sub-image is equal or greater than the number of projectors. This also requires the image sub-regions have to be derived in a way that there is at least one sub-region contains the greater amount of high frequency band information than all other sub-regions inside any image stacking. Further in another embodiment of the present disclosure, all sub-images are derived from the original image before being stored and transmitted as system input images. For example, when multiple synchronized play servers or multiple synchronized DCPs (digital cinema package) or multiple synchronized image source streams are used. Among all sub-images, there is one and only one sub-region of each sub-image that contains the higher frequency band information of the original image than the same sub-region in all other sub-images. In other words, this requires the number of sub-regions in a sub-image is equal or greater than the number of projectors. This also requires the image sub-regions have to be derived in a way that there is at least one sub-region contains the greater amount of high frequency band information than all other sub-regions inside any image stacking.

Figure 3:
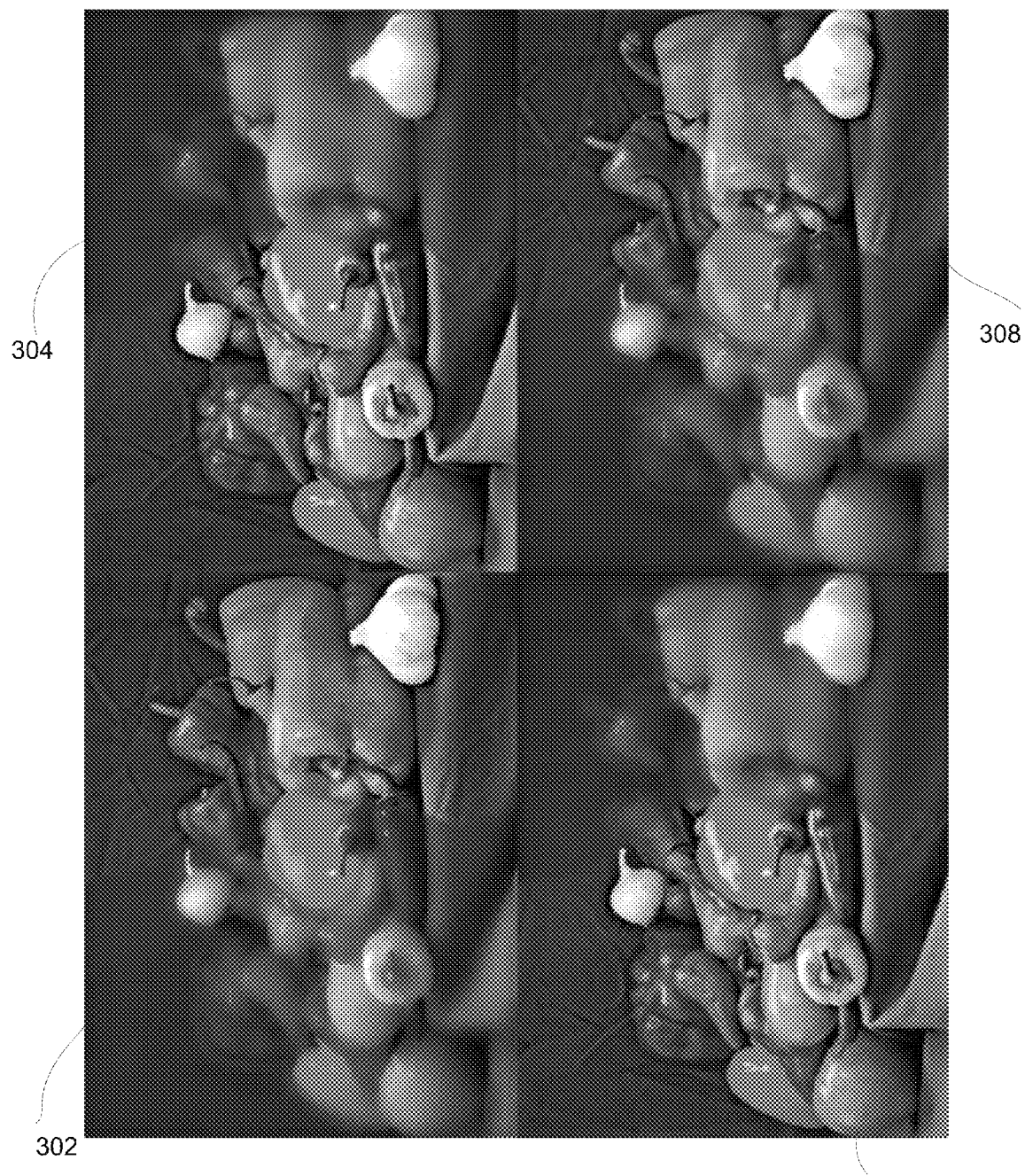
FIG. 3 illustrates an example of derived images for multi-dimensional stacking.

FIG. 3 shows an example of the derived images for multi-dimensional stacking in one embodiment of the present disclosure. 302 is the first sub-image for the first projector of the first sub-frame; 304 is the second sub-image for the second projector of the first sub-frame; 306 is the second sub-image for the first projector of the second sub-frame; 308 is the first sub-image for the second projector of the second sub-frame.

The example shown represents a temporal stacking frame pair. Because the two sub-frames are constructed from the different projector stacking methods. The first sub-frame is constructed from the first projector stacking method and the second sub-frame is constructed from the second projector stacking method.

Within each projector stacking of one embodiment of the present disclosure, the two sub-images are derived or transmitted so that one for each projector. Each sub-image is also divided into two sub-regions. The sub-region division is same for both sub-images. For example, in image stacking of sub-image 302, there is one sub-region on the right side of the image contains the greater amount of high frequency band information in additional to other frequency band information of the original image than the other sub-region on the left side. The sub-region on the left side contains mostly only lower frequency band information of the original image than the right side sub-region. While in image stacking of sub-image 304, there is also only one sub-region on the left side of the image contains the greater amount of high frequency band information in additional to other frequency band information of the original image than the other sub-region on the right side. The sub-region on the right side contains mostly only lower frequency band information of the original image than the left side sub-region. Therefore, within this projector stacking, for the left side sub-region, there is one and only one sub-region, which is in sub-image 304 left side, contains the higher frequency band information in additional to other frequency band information of the original image than the same left sub-region in both sub-images 302 and 304; similarly, for the right side sub-region, there is one and only one sub-region, which is in sub-image 302 right side, contains the higher frequency band information in additional to other frequency band information of the original image than the same right sub-region in both sub-images 302 and 304. Similar image derivation happens in sub-images 306 and 308. So in one embodiment of the present disclosure, every projector, at any time, is displaying a largely different image with a mixed group of non-overlapping sub-regions that each contains different frequency bands information of the original image. But the superposition of all sub-images from all projectors must be identical or considered better quality image of the original image to be displayed.

There are many ways for those ordinary skilled in the art to achieve the described image derivation. For the sake of explanation and exemplary image processing, the method described below to derive sub-images from input original image should not be considered as a limitation of useable algorithms.

In one embodiment of the present disclosure, given an original input image I with display gamma decoded, calculate from the image content or define a sub-region boundary S. The boundary S will separate the image I into two sub-regions I1 and I2, and generate the soft mask of each sub-region as R1 and R2 based on I1 and I2 so that I=I1*R1+I2*R2. Select an edge preserving low pass filtering method, for example, a bilateral filter or other more advanced methods, to filter the sub-region images I1*R1 and I2*R2 separately to get the resulting sub-region images L1 and L2. Then update L1 and L2 to L1=max((2*I1*R1−1,0)+min(L1, 2*I1*R1) and L2=max((2*I2*R2−1,0)+min(L2, 2*I2*R2) respectively. Then calculate H1=2*I1*R1−L1 and H2=2*I2*R2−L2. Finally update I1 and I2 to I1=L1*R1+H2*R2 and I2=H1*R1+L2*R2 respectively.

A bilateral filter is an edge-preserving and noise reducing smoothing filter. The intensity value at each pixel in an image is replaced by a weighted average of intensity values from nearby pixels. This weight is based on a Gaussian distribution. Crucially the weights depend not only on Euclidean distance but also on the radiometric differences (differences in the range, e.g. color intensity). This preserves sharp edges by systematically looping through each pixel and the weights to the adjacent pixels accordingly.

A more general sub-image derivation method could be described from a frequency analysis point of view. The sub-image derivation for projector stacking in the present disclosure requires an image filtering process localized in both space and frequency. Because an ideal sub-image has not only spatial limiting requirements as local sub-regions but also frequency domain limiting requirements as local sub-band frequency filtering. A nature tool to achieve these two localizations simultaneously is the wavelet transform based frequency analysis method. Providing a source image comprising a plurality of pixels, each pixel having a value. Compute multiple levels of one type of wavelet transform using one type of wavelet, or multiple levels of one type of packet wavelet transform using one type of wavelet; assume the computed wavelet transform or packet wavelet transform coefficients of the original image are W. Then also calculate from the original image content or define a sub-region boundary; calculate and apply the corresponding sub-region boundaries onto wavelet transform coefficients in multiple levels and scales of the wavelet transform or packet wavelet transform; within each corresponding sub-regions of the wavelet transform coefficients in multiple levels and scales of the wavelet transform or packet wavelet transform, retain the coefficients of higher frequency bands for the selected sub-region which is required to have higher frequency band information of the original image; while reduce the coefficients of higher frequency bands for the other sub-regions. After the modification, the complete wavelet coefficients for this sub-image is Wi; then apply the inverse wavelet transform or packet wavelet transform from the modified wavelet transform or packet wavelet transform coefficients Wi to get the derived sub-image for targeted projector stacking. Apply the similar process to every sub-image within the same projector stacking and make sure all modified wavelet transform or packet wavelet transform coefficients Wi add up equal to the original image wavelet transform or packet wavelet transform coefficient W. That is, W1+W2+W3+ . . . +Wn=W. n is the number of sub-images or number of projectors in the system, which in a default system is 2.

Figure 4:
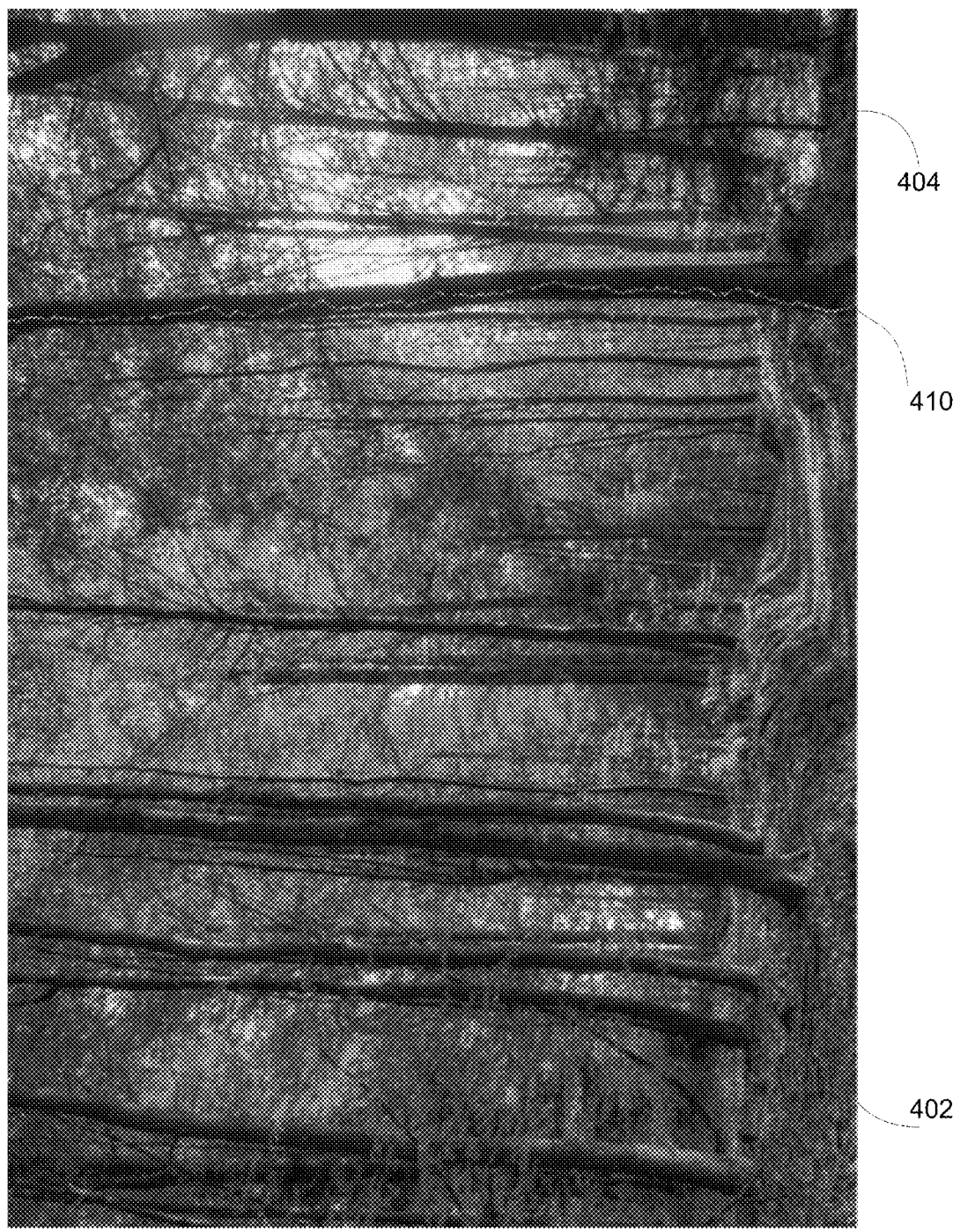
FIG. 4 illustrates an example of minimum energy boundary used for 2D spatial stacking.

FIG. 4 shows an example of minimum energy boundary used for 2D spatial image stacking. In order to separate a sub-image into sub-regions for image stacking, a sub-region boundary needs to be defined. The best sub-region boundary is a soft boundary that, when used to generate all sub-images for the projector stacking, introduces the minimum visible artifact if there is any alignment error between all the projectors. This requires the sub-region boundary to be located in the lowest frequency or least image detail or smoothest image area. To find such a minimum energy path separating image into two parts is a well-know image processing energy optimization problem that can be solved by various well established methods. To those ordinary skilled in the art the following simple exemplary method is just for the sake of illustration but not meant to be limiting to this algorithm. First to calculate the absolute 2 dimensional gradient map of the provided source input image; generate a minimum energy image map by looping through row by row or column by column and accumulating the minimum energy for all possible path choices (must be 8-neighbor connection); then based on the generated minimum energy image map, derive the boundary vectors by looping backwards through row by row or column by column again and search for the minimum accumulated energy values and their locations.

The determination of minimum energy boundary can also be managed by thresholding. A pre-defined or adaptive dynamic thresholding can be used along with above algorithms to control the maximum allowable energy could be in the sub-region boundary path. For certain images the condition could not be met, the default boundary or pre-defined boundary or action can then apply, which may include a degraded case of division of sub-regions.

Example in FIG. 4 shows an optimal least energy boundary 410 was found by the exemplary method, which is located almost all inside a tree's black shadow, where indeed has the least texture and energy. The best boundary successfully separates the image into left sub-region 402 and the right sub-region 404.

Figure 5:
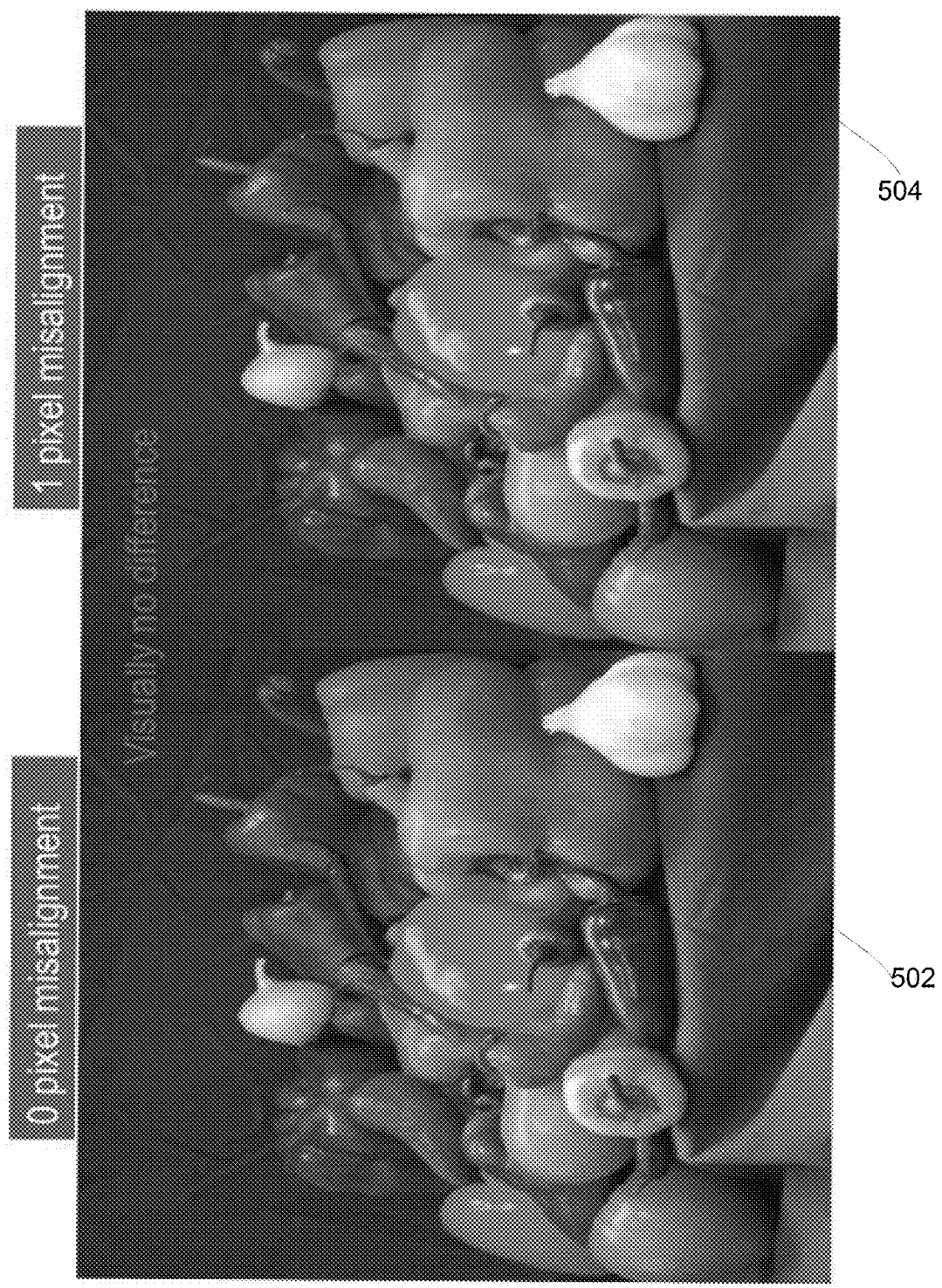
FIG. 5 illustrates a comparison example of high quality result after 3D spatial stacking with or without projector misalignment.

FIG. 5 illustrates a comparison example of high quality result after 3D spatial stacking with or without projector misalignment. The left side image 502 is the resulting image after the projector stacking, i.e. the superposition of the first sub-image 302 from the first projector and the second sub-image 304 from the second projector. Assuming a perfect alignment and identical and uniform brightness between the two projectors. The right side image 504 is the resulting image after the projector stacking, i.e. the superposition of the first sub-image 302 from the first projector and the second sub-image 304 from the second projector. Assuming a perfectly identical and uniform brightness, but with a vertical misalignment of 1 pixel between the two projectors. As one can see, there is no perceivable difference between the two resulting image 502 and 504.

The objective according to the first aspect of the present disclosure met by the method and system used to achieve the described spatial image stacking in the first x and second y dimensions within an image being displayed by one or more projectors. The method includes (1) calculate or define a set of minimum energy boundaries within the source image; (2) divide the source image into sub-regions using those boundaries; (3) use a spatial or frequency domain processing methods to decompose source image content into sub-images with sub-regions according to the space and frequency localization requirements defined by sub-regions boundaries and (4) so that at least one sub-region contains a greater amount of high frequency band information than all other sub-regions.

The first of the many aspects from the image stacking is its necessity and usefulness to work with projector stacking and/or temporal stacking for self-correcting feature that is described in more detail later. For example, in one simple embodiment of the present disclosure, a single frame of sensor captured image may be enough to detect the misalignment between projectors. By using spatial stacking including only image stacking and projector stacking, single captured image already contains resulting images from both the first projector stacking method in one sub-region and the second projector stacking method in another sub-region. The global misalignment between the first projector and the second projector may be detected at the image region boundary from any continuous features of the displayed original images. That is, the original continuous feature across image region boundary will not be continuous any more in the sensor captured image; the amount of discontinuity reflects the amount of misalignment between two projectors along the boundary seam direction. Defining various image sub-region boundary directions can help detecting the accurate misalignment correction vectors. In another alternative approach of misalignment measurement, by first warping and comparing the blocks in the first sub-region of the captured image to the same blocks in the original image and calculating the disparity if any; then warping and comparing the blocks in the second sub-region of the captured image to the same blocks in the original image and calculating the disparity if any; the content of the two blocks do not need to be same, similar, or continuous in this approach; so the difference between the first calculated disparity and the second calculated disparity can represent the rough misalignment between projectors. The measurement is further corrected by the difference found between these two blocks from the camera calibration. The true misalignment between projectors can be then correctly estimated.

The second of the many aspects from the image stacking is each sub-image for one projector contains similar amount of average energy or in another word, brightness even the image content may be different. Because each sub-image always comprises both low frequency and high frequency energy at the same time; where it consists of at least one significant portion of high frequency energy of a specific region, but nearly equal portions of low frequency energy of all the sub-regions. For most nature images, the low frequency energy dominates the total image energy, so statistically, no matter how sub-regions are divided; the average energy or brightness of each sub-image is about the same.

The third of the many aspects from the image stacking is each sub-image for one projector is secure in transmission in terms of anti-piracy. Because even though every sub-image comprises both low frequency and high frequency information at the same time; but there are sub-regions contains only low frequency information but no detail image information; therefore make the whole sub-image unwatchable. When every sub-image is transmitted to the projector for display, it may not need to be encrypted for security reason strictly required by DCI (digital cinema initiatives) specifications. It is especially beneficial when multiple synchronized play servers or multiple synchronized DCPs (digital cinema package) or multiple synchronized image source streams are used, each image source stores and transmits a different unwatchable sub-image that contains only a portion of higher frequency original image details but statistically balanced among sub-images. So the added security property exists not only in transmission but also in storage.

The fourth of the many aspects from the image stacking is the improved content transmission and storage performance due to the statistically balanced frequency energy of sub-images. Because each sub-image is now having roughly balanced frequency component and energy, the performance of image compression using a given codec is also balanced or improved; especially the performance of transmitting it through a given bandwidth digital channel is also balanced or improved if compared to unbalanced image compression and transmission. For example, when multiple synchronized play servers or multiple synchronized DCPs (digital cinema package) or multiple synchronized image source streams are used; the original image high frequency detail and energy could be evenly distributed and compressed or transmitted in multiple digital channels of a same bandwidth, it avoids one digital channel becoming a bottleneck and starting to lose information; therefore improves the overall system image quality.

The fifth of the many aspects from the image stacking is the use of soft minimized energy region boundaries. This makes not only region transition always occurs in a low image detail area, but also the additional soft nature of the boundary will further hide region transitions even if there is still some image details.

The sixth of the many aspects from the image stacking is its possible use for local image enhancement feature. Each sub-region can be given a different weight to enhance the local part or the whole final displayed image. For example, a sub-region of a sub-image for one projector is containing a greater amount of high frequency information of the original image, if the weight of this sub-region is increased, the portion of that sub-region in the final image would become slightly sharper in details.

The objective according to the second aspect of the present disclosure met by the method and system used to achieve the described spatial projector stacking in the third z dimension between sub-images being displayed by two or more projectors. The method includes (1) calculate or define multiple sub-region boundaries and sub-regions in sub-images; the number of sub-regions is equal or more than the number of projectors; (2) use a spatial or frequency domain processing methods to decompose source image content into sub-images and sub-regions according to the space and frequency localization requirements defined by sub-regions boundaries and (3) that at least one sub-region contains a greater amount of high frequency band information than all other sub-regions; and (4) there is one and only one sub-region in any sub-image contains the higher frequency band information than the same sub-region in all other sub-images.

The first of the many aspects from the projector stacking is that, among all sub-images, or in other words, images displayed simultaneously by all projectors, there is only one pixel in one sub-image, which is corresponding to a pixel in the source image, contains the image detail or highest frequency information; all other pixels in other sub-images, which are corresponding to the same pixel in the source image, contains only lower frequency information. This image detail separation between projectors, removes the need for that high frequency information, or image details to be precisely aligned because at any given time, there is only one projector is displaying that image detail information. While registration issue between multiple projectors becomes aligning only lower frequency information images, which is a much relaxed requirement and therefore the whole system becomes more robust to small misalignments and can produce better image quality. This spatial stacking technique is critical to handle the projector vibration problems mentioned earlier in the background section, which is caused by thermal, mechanical and environmental factors like exhaust air, vent fan and sub-woofer from audio system. The relative position of every pixel of each projector becomes almost unpredictable. This kind of registration error can not be efficiently tracked and corrected by other methods, but it is gracefully addressed and improved by this aspect of the present disclosure.

The second of the many aspects from the projector stacking is its combination with temporal stacking could improve the system robustness to non-uniformity of projector brightness. In one embodiment of the present disclosure, temporal stacking frames are fast toggling between the first projector stacking method and the second projector stacking method, if the toggling is fast enough, the brightness non-uniformity between multiple projectors if any, will be temporally averaged out and appear to be uniform to human eyes. So the projector stacking and temporal stacking could help to improve the system tolerance to small brightness non-uniformity among projectors. Especially when the frame rate is above certain threshold, the flicker free brightness uniformity could even be achieved for larger non-uniform projectors.

The third of the many aspects from the projector stacking is its necessity and usefulness to work with image stacking and/or temporal stacking for self-correcting feature, which is being described later.

The fourth of the many aspects from the projector stacking is it could reduce the screen door effect caused by limited projector resolution, especially in DLP projectors. Since in a projector stacking configuration, the physical pixel grid of each projector is slightly misaligned and randomly overlapped on screen; and the brightness of sub-images displayed is statistically same, therefore the screen door effect will be greatly suppressed.

The fifth of the many aspects from the projector stacking is it could reduce the system unevenly aging and degradation. Since in an alternative projector stacking configuration without combining image stacking and temporal stacking, each projector may be displaying a persistently different image. So one image could be constantly brighter than the other image, this could cause projectors unevenly used and degraded. In a projector stacking configuration described in present disclosure, each projector is displaying statistically same brightness sub-images, the optical components and light engine could be used equally and therefore age and degrade relatively equally, which could prolong the life of the system as a whole. The balanced optical and electronic properties could also reduce the potential pixel registration error or performance degradation speed developed over time by the uneven pixel drifting and different distributions among projectors.

The sixth of the many aspects from the projector stacking is its possible use for image enhancement feature. Each sub-region can be given a different weight to enhance the final displayed image. For example, if the weight of a sub-image for one projector containing higher frequency information of the original image is slightly increased, the portion of that sub-region containing higher frequency information of the original image in the final image would become slightly sharper in details.

Figure 15:
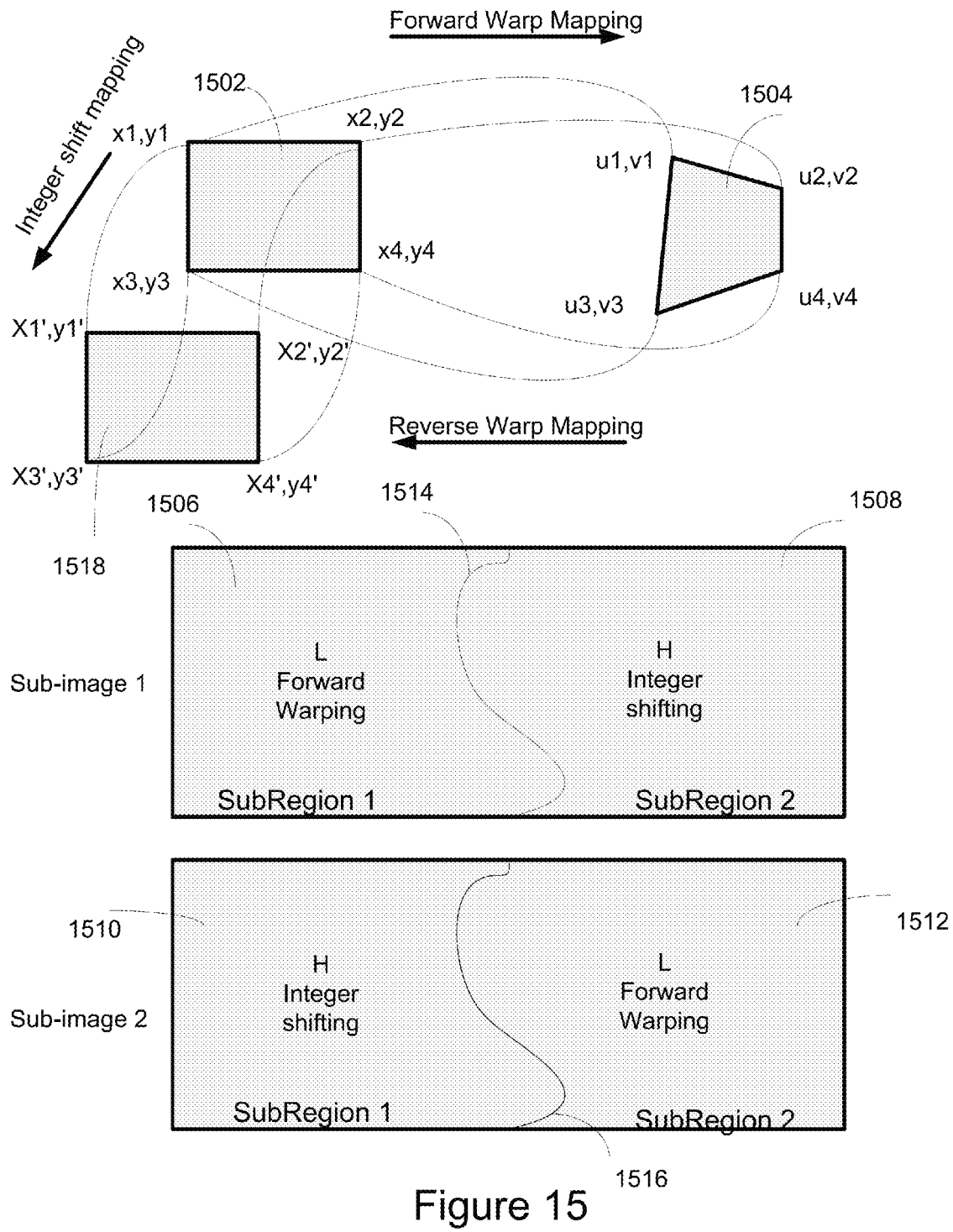
FIG. 15 illustrates optional image warping arrangement of sub-region and sub-image 3D spatial stacking.

Projector stacking requires registration between projectors through image warping. FIG. 15 illustrates an optional image warping processing of sub-regions and sub-images in the three-dimension spatial stacking for one embodiment of the present disclosure. A shape 1502 and its vertex coordinates in one space are (x1,y1), (x2,y2), (x3,y3), (x4,y4); its corresponding shifted version of shape 1518 and vertex coordinates in the same space are (x1',y1'), (x2',y2'), (x3',y3'), (x4',y4'); its another corresponding transformed shape 1504 and vertex coordinates in another space are (u1,v1), (u2,v2), (u3,v3), (u4,v4). The transform function converts from coordinates x,y to x',y' is defined as a global planar shifting with integer number of whole pixels. It is called integer shift mapping which is normally a very fast operation taking trivial processing time. An integer shift mapping does not change image shape and relative coordinates, and it does not change the image quality within a device because it does not need image resampling; The transform function converts from x,y coordinates to u,v coordinates is called forward warp mapping and the transform function converts from u,v coordinates to x,y coordinates is called reverse warp mapping. The forward warp mapping function and the inverse warp mapping function can be measured or derived or calculated from the registration calibration between projectors.

Based on the analysis in background section, warping undergoes image resampling that will cause image degradation with blur by truncating frequency range to half band and with possibly aliasing. Therefore warping also reduces the theoretical up limits of the projector registration to 0.5 pixels or more. So in the spatial stacking methods and systems in the present disclosure, the warping only applies to the sub-regions in sub-images where no higher frequency information resides. For example as shown in FIG. 15, the first sub-image comprises the first sub-region 1506 with low frequency information image L and the second sub-region 1508 with high frequency information image H. The two sub-regions 1506 and 1508 are connected by the soft minimum energy boundary 1514. The second sub-image comprises the first sub-region 1510 with high frequency information image H and the second sub-region 1512 with low frequency information image L. The two sub-regions 1510 and 1512 are connected by the soft minimum energy boundary 1516.

The second sub-region 1508 with high frequency information H in the first sub-image is being modified globally by the integer shift mapping function to the closest integral location relative to the first sub-region 1510 with high frequency information H in the second sub-image with a least total error on their boundary; while the first sub-region 1506 with low frequency information L is being modified by the forward warp mapping function to match the pixels in the first sub-region 1510 with high frequency information H in the second sub-image; similarly, The first sub-region 1510 with high frequency information H in the second sub-image is being modified globally by the integer shift mapping function to the closest integral location relative to the second sub-region 1508 with high frequency information H in the first sub-image with a least total error on their boundary; while the second sub-region 1512 with low frequency information L is being modified by the forward warp mapping function to match the pixels in the second sub-region 1508 with high frequency information H in the first sub-image. In case of the inversed projector stacking, i.e. the second projector stacking method, all steps of processing remain the same except for all sub-regions and their processing is swapped. In another embodiment of the present disclosure, the reverse warp mapping is used in place of forward warp mapping while all other processing remain the same.

With the above warping arrangement and processing, all the warping operations degrading image quality are carried out to those image sub-regions with only low frequency information. As long as there is no higher frequency information more than the half of the maximum normalized image sampling frequency in those sub-regions, which is mostly the case, the warping operation will not cause any degradation to it. On the other side, all the sub-regions containing the higher frequency information are processed by the integer shift mapping function which needs trivial processing time and causes no image quality degradation too. So with the combination of the above processing, the image quality and sharpness can be kept and improved over traditional stacking projection system using warping blindly; therefore it raises the theoretical registration limit for a self-correcting projection system based on the present disclosure.

Figure 6:
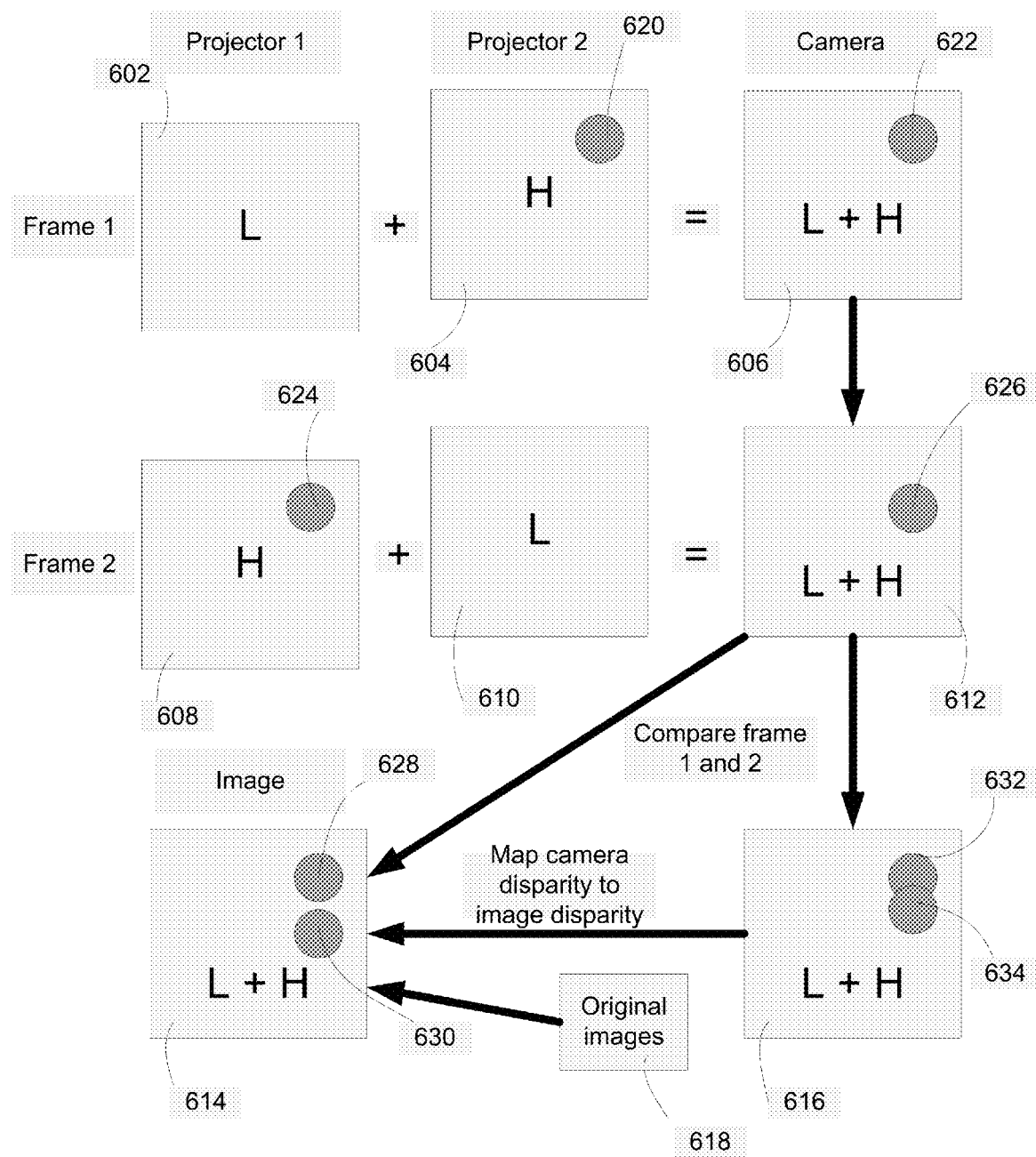
FIG. 6 illustrates the method of self-correcting registration.

The objective according to the third aspect of the present disclosure met by the method and system used to achieve the described temporal stacking FIG. 6 illustrates the basic methods of how self-correcting registration works via the temporal stacking projection. Self-correcting in registration by temporal stacking is according to the third aspect of the present disclosure which involves a negative feedback method and system to automatically detect and correct the dynamic changed registration error unnoticeably, and in background and parallel to the projection system's normal show playing or other image presentation. All it needs are installed sensor and the current images to be displayed. There is no need for special calibration test pattern images, explicit show stop time and an exclusive calibration stage.

FIG. 6 shows a first projector stacking for the first sub-frame containing a first sub-image 602 for the first projector and that contains a low frequency image region L; a second sub-image 604 for the second projector and that contains a high frequency image region H; where the high frequency image region H contains an image detail object 620 in a block in its current image position. After the projector stacking with a misalignment between the first projector and the second projector shown, the resulting image 606 will combine both 602 and 604 image regions L+H and with the image detail object 622 in the block at the position mostly determined by the high frequency image region H 604 or the second projector. This result can be already a high quality image that is essentially identical or better than the original image regardless the misalignment. The result is captured by the sensor camera as in a captured image 606. Similarly, the second projector stacking for the first sub-frame containing a first sub-image 608 for the first projector and that contains a high frequency image region H, where the high frequency image region H contains an image detail object 624 in its block in its current image position; in one embodiment of the present disclosure according to projector stacking, this image block will be essentially same or very similar as the block in the sub-image 604 and this image detail object 624 will be also essentially same or very similar as the object 620 in the sub-image 604; a second sub-image 610 for the second projector and that contains a low frequency image region L; After the projector stacking with a same misalignment between the first projector and the second projector shown, the resulting image 612 will combine both 608 and 610 image regions H+L and with the image detail object 626 at the position mostly determined by the high frequency image region H 608 or the first projector. This result can be already a high quality image that is essentially identical or better than the original image regardless the misalignment. The result is captured by the sensor camera as in a captured image 612. Because the first sub-frame and the second sub-frame are stacked consequently in time and the original images of all sub-frames can be available for processing as a comparison baseline, additionally the two captured image 606 and 612 are captured from the same sensor, same angle, same geometry position and distortion over a very short period of time, therefore image 606 and 612 can be directly compared in 616 with a possible feature tracking of image detail object 632 against image detail object 634 in a default setup; the comparison in the default setup has obvious advantage due to its independency to sensor calibration errors; or in a alternative setup, they can be compared after a calibrated warp mapping function from the captured space geometry into image space 614 with a possible feature tracking of image detail object 628 moved to image detail object 630. The alternative comparison is still advantageous because even the warp mapping function from sensor to screen contains calibration error, the error will be same to both captured images, and therefore the difference comparison or detail object position tracking will still be accurate except for a scaled magnitude. Yet in another alternative embodiment of the present disclosure according to the comparison between image 606 and 612 when the content in two images is not essentially same or very similar, by first warping and comparing the blocks in the first captured image 606 to the same blocks in the original image 618 and calculating the disparity if any; then warping and comparing the blocks in the second captured image 612 to the same blocks in the original image 618 and calculating the disparity if any; the content of the two blocks do not need to be same or similar in this approach; so the difference between the first calculated disparity and the second calculated disparity can represent the misalignment between projectors. The measurement is further corrected by the difference found between these two blocks from the camera calibration. The true misalignment between projectors can be then estimated.

The feature tracking or disparity calculation method is not the concern of the present patent; so it can be any general or specially designed methods which can be used to find the similar objects or content in images shifting from one image to another image in number of pixels. For higher accuracy the tracking or disparity detection could be carried out down to sub-pixel level where the shifting pixel number could be in fractional number. In one exemplary embodiment of the present disclosure, the disparity detection method could be a phase correlation method. Phase correlation is a method of image registration, and uses a fast frequency domain approach to estimate the relative translative offset between two similar images. It applies a window function on both images and calculate the discrete 2D Fourier transform of both images; then calculate the cross-power spectrum by taking the complex conjugate of the second result, multiplying the Fourier transforms together elementwise, and normalizing this product elementwise. Obtain the normalized cross-correlation by applying the inverse Fourier transform of the result. Then determine the location (dx and dy) of the peak in the normalized cross-correlation result using possibly sub-pixel edge detection method. Yet in another embodiment of the present disclosure, a more common method used to detect disparity or motion tracking is to take the spatial 2D cross-correlation directly between two images, and then find the 2D location (dx and dy) of the peak correlation value. To those ordinary skilled in the art, it is obvious that other disparity detection or motion tracking methods can be used to achieve the same purpose here in the present disclosure.

The usefulness of the spatial and temporal stacking design shown in FIG. 6 can summarized as following: (1) with the special spatial stacking including image stacking and projector stacking designed in the present disclosure, at the same time displaying a high quality image that is essentially identical or better than the original image regardless the misalignment, the sensor captured result 606 from the first sub-frame is basically manifesting the world relative misalignment from the second projector to the first projector; the sensor captured result 612 from the second sub-frame is basically manifesting the world relative misalignment from the first projector to the second projector; which is same as that of the first sub-frame in magnitude but in the opposite direction; (2) so the difference if any, detected in background between the captured results 606 and 612 will be manifesting both the magnitude and the direction of the true misalignment between the first projector and the second projector; (3) with the special spatial stacking including image stacking and projector stacking designed in the present disclosure, at the same time displaying a high quality image that is essentially identical or better than the original image regardless the misalignment, the sensor captured result 606 from the first sub-frame is basically manifesting the resulting brightness when high frequency energy is on the second projector assuming other frequency energy is same on both projectors; the sensor captured result 612 from the second sub-frame is basically manifesting the resulting brightness when high frequency energy is on the first projector assuming other frequency energy is same on both projectors; (4) so the difference if any, detected in background between the captured results 606 and 612 will be manifesting the relative brightness difference between the first projector and the second projector; (5) the misalignment detection on the captured results 606 and 612 or 616 or 614 is advantageous because the accuracy requirement of the registration relationship or conversion from sensor image space to source image space is reduced; (6) the brightness detection on the captured results 606 and 612 or 616 or 614 is advantageous because not only the accuracy requirement of the registration relationship or conversion from sensor image space to source image space is reduced; but also the calibration requirement from sensor reading to projection screen brightness may not be needed at all. (7) again the misalignment detection on the captured results 606 and 612 or 616 or 614 is also advantageous because this detection and correction of misalignment can happen continuously and constantly, so the accuracy requirement of the registration relationship or conversion from sensor image space to source image space can be reduced; the correction can be applied step by step until it finally converges; (8) again the brightness detection on the captured results 606 and 612 or 616 or 614 is advantageous because not only the accuracy requirement of the registration relationship or conversion from sensor image space to source image space is reduced; but also the calibration from sensor reading to projection screen brightness is not needed; the correction can be applied step by step until it finally converges.

Figure 7:
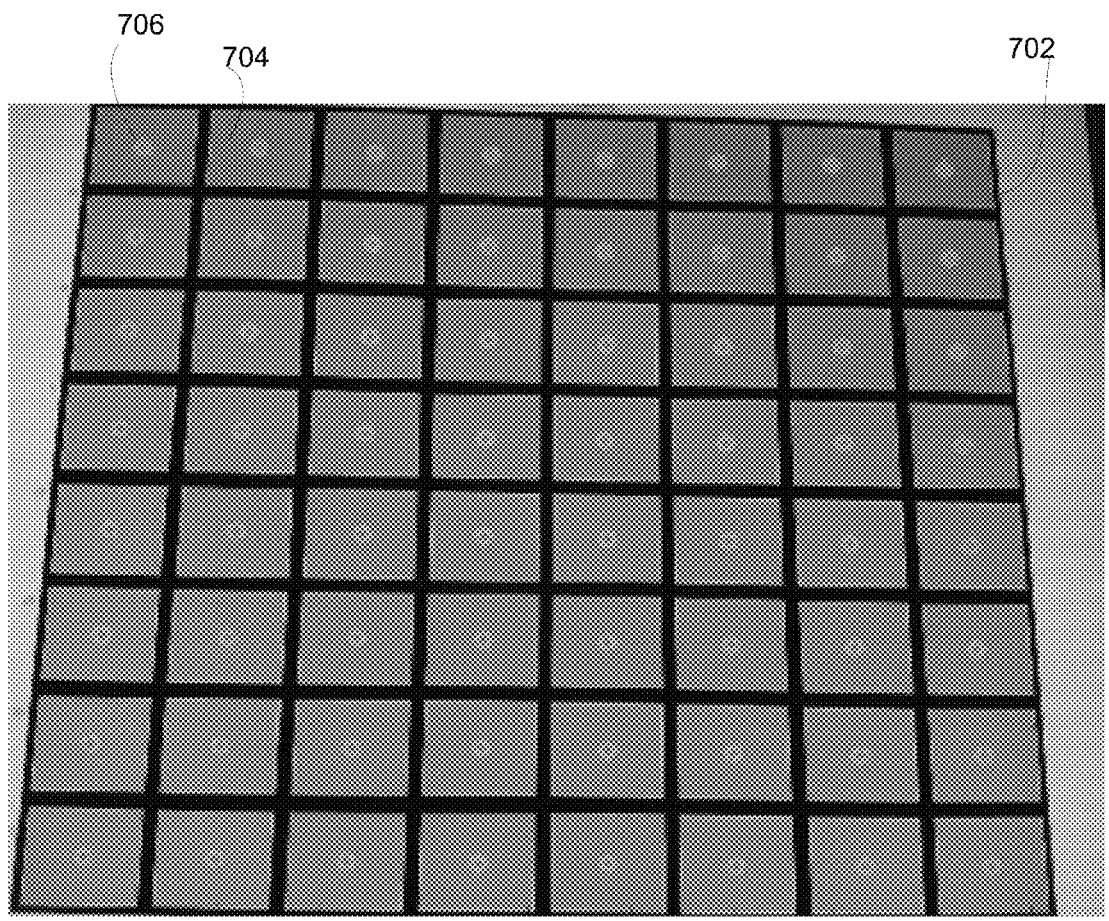
FIG. 7 illustrates an example of the feedback sensor registration result for self-correcting.

FIG. 7 illustrates an example of the feedback sensor registration calibration for self-correcting feature. Even though the accuracy requirement of the registration relationship or conversion from sensor image space to source image space is reduced in the present disclosure because the iterative negative feedback correction mechanism exists, the better registration is still helpful to reduce the iteration and increase the final accuracy in the stable state of the system. The calibration of sensor is a separate traditional process which requires a test pattern. The whole test pattern image 702 is evenly divided into small regions 704. After the test pattern 702 gets displayed on screen, sensor captures an image of it and then the centroids of each segmented regions 706 are calculated and a forward warp mapping from known coordinates in the original test pattern image to the coordinates of calculated centroids in sensor captured image can then be easily established. The mapping of all other pixels can be interpolated by the calibrated data. Generally the more test pattern regions are used, the higher accuracy the overall registration mapping will be.

Figure 8:
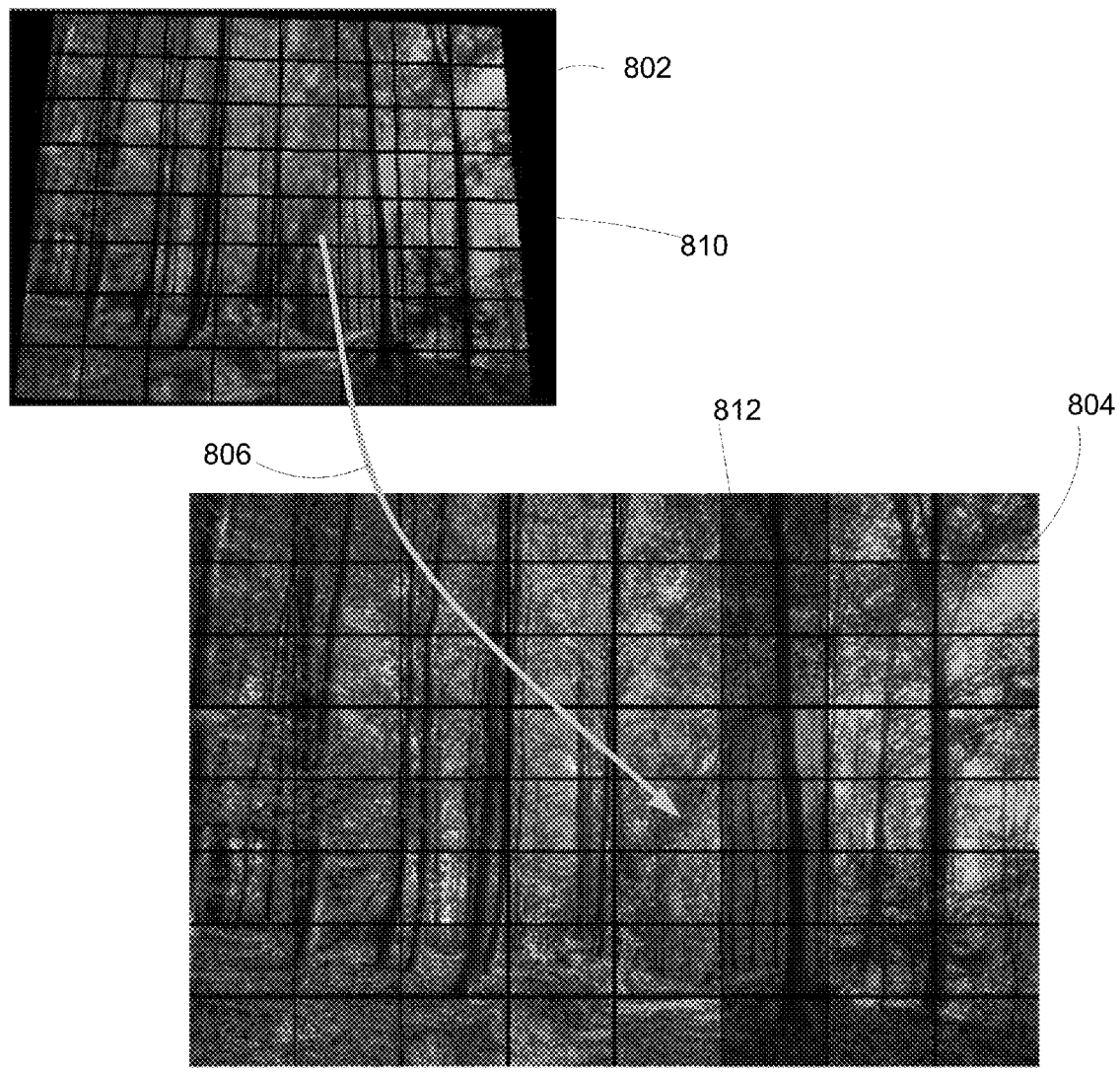
FIG. 8 illustrates an example of the feedback sensor reverse warp mapping with image blocks from a captured image to its estimated source image.

FIG. 8 shows an example of the feedback sensor reverse warp mapping with image blocks from a captured image to its estimated source image. 802 is the captured image with a resolution of 1280 by 720; 804 is the estimated source image of the captured image with a resolution of 2048 by 1080; all images are evenly divided into multiple smaller blocks like 810 and 812, where 810 is an image block in the captured image 802, while 812 is the corresponding block in the estimated image. The estimation is carried out by using the reverse warp mapping 806 derived from the forward warp mapping in sensor registration calibration showed in FIG. 7.

The specific forward and reverse warp mapping methods are not the concern of the present disclosure. So it can be any general or specially designed warping methods for those ordinary skilled in the art. In one exemplary embodiment of the present disclosure, a perspective transform or 3D perspective projection method can be used to find the transform that maps one arbitrary 2D quadrilateral into another.

Figure 9:
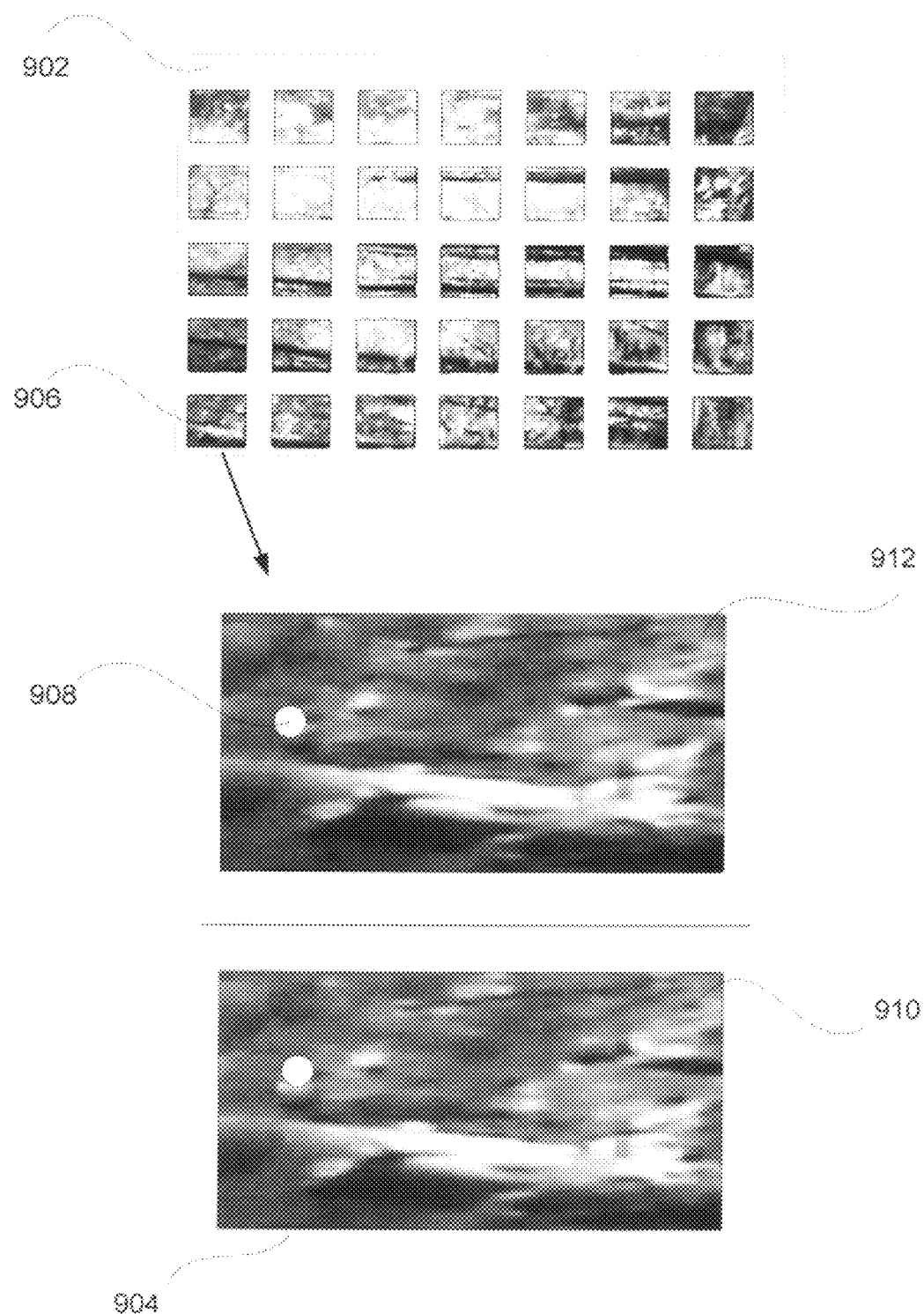
FIG. 9 illustrates an example of the registration self-correction for image blocks.

FIG. 9 illustrates an example of the registration self-correction for image blocks. To those ordinary in the art, the total number of image blocks and the block size can be chosen arbitrarily as long as an optimization among projector registration accuracy, captured image feature disparity detection accuracy and total computational complexity is achieved. In one embodiment of the present disclosure, the sensor captured image of the first sub-frame in the temporal stacking can be compared directly with the sensor captured image of the second sub-frame; yet in another embodiment of the present disclosure, both sensor captured images are first rectified into the source image space before being compared for registration disparity. The image 902 is the estimated rectified image from the captured image of the first sub-frame in the temporal stacking using the reverse warp mapping 806 derived from the forward warp mapping in sensor registration calibration showed in FIG. 7; where at the same location of the first image block 906, the captured image block 910 of the first odd sub-frame is compared with the captured image block 912 of the second even sub-frame. The feature detection and registration error estimation processing 904 finds a disparity at 908 a vertical shift up of 0.69 pixels from the first sub-frame to the second sub-frame. Since the first sub-frame basically manifests the world position of the second projector and the second sub-frame basically manifests the world position of the first projector, so the detected 0.69 pixels can be interpreted as that in the projector stacking, the second projector image is projected about 0.69 pixels lower than the first projector image. In order to correct this detected error, the second projector image can be warped up by 0.69 pixels to match the first projector image; or the first projector image can be warped down by 0.69 pixels to match the second projector image; or the first projector image can be warped down by 0.345 pixels and the second projector image can be warped up by 0.345 pixels to match each other. After the correction, the processing repeats in real time to check and correct the resulting registration error. If the projectors are perfectly registered, the detected error should be 0 and the correction becomes 0 too. Yet in a third alternative embodiment of the present disclosure that it does not require the content in both sensor captured images being essentially same or very similar; by first warping and comparing the blocks in the first captured image to the same blocks in the original image and calculating the disparity if any; then warping and comparing the blocks in the second captured image to the same blocks in the original image and calculating the disparity if any; so the difference between the first calculated disparity and the second calculated disparity can represent the rough misalignment between projectors. The measurement is further corrected by the difference found between these two blocks from the camera calibration. The true misalignment between projectors can be then estimated.

Figure 10:
FIG. 10 illustrates an example of degraded image quality if present disclosure with self-correcting is not used.

FIG. 10 illustrates an example of degraded image quality if present disclosure with self-correcting is not used. The first and second aspects of the present disclosure together provide the first novel way to reduce the misregistration sensitivity of the stacking projection system; it greatly relaxes its requirements for a very accurate sub-pixel registration for high image quality in large screen, and especially for higher resolution at 4K and beyond projection display; it is also critical to improve image quality and address those fast changing, with irregular or even random path, and almost impossible to track misalignment caused by thermal or vibration. But it does not address the problem that if the initial registration is not accurate or the registration is getting worse and worse. In other words, it does not help to first get the accurate registration or calibration, nor then to maintain the accurate registration or calibration. When the registration or calibration is degrading, the artifacts start to show. For certain high contrast pixels in certain scene as illustrated in FIG. 10, the artifact could become visible even with relative small misalignment. The right side image 1006 is an example of projection using only the methods described in the first and second aspects of the present disclosure.

The first and second aspects of the present disclosure together could also provide the second novel way to self improve and correct the calibration without using the third aspect of the present disclosure. In one embodiment of the present disclosure, a single frame of sensor captured image after projector stacking may be enough to detect the misalignment between projectors. By using spatial stacking including only image stacking and projector stacking, single captured image already contains resulting images from both the first projector stacking method in one sub-region and the second projector stacking method in another sub-region. The global misalignment between the first projector and the second projector may be detected at the image region boundary from any continuous features of the displayed original images. That is, the original continuous feature will not be continuous any more in the sensor captured image; the amount of discontinuity reflects the amount of misalignment between two projectors. In another alternative approach of misalignment measurement, by first warping and comparing the blocks in the first sub-region of the captured image to the same blocks in the original image and calculating the disparity if any; then warping and comparing the blocks in the second sub-region of the captured image to the same blocks in the original image and calculating the disparity if any; the content of the two blocks do not need to be same or similar in this approach; so the difference between the first calculated disparity and the second calculated disparity can represent the rough misalignment between projectors. The measurement is further corrected by the difference found between these two blocks from the camera calibration. The true misalignment between projectors can be then estimated.

The left side image 1002 of FIG. 10 is the same image but after using both the first and the second aspects of the present disclosure for self-correcting or more robustly using the first and the second and the third aspects of the present disclosure for self-correcting. The artifact due to calibration degradation and drifting can be avoided. Self-correcting feature is the important aspect of the present disclosure to improve the initial calibration; and also to correct and maintain the drifted or changed calibration over the time, therefore ensure a persistent and optimized overall display image quality.

Figure 11:
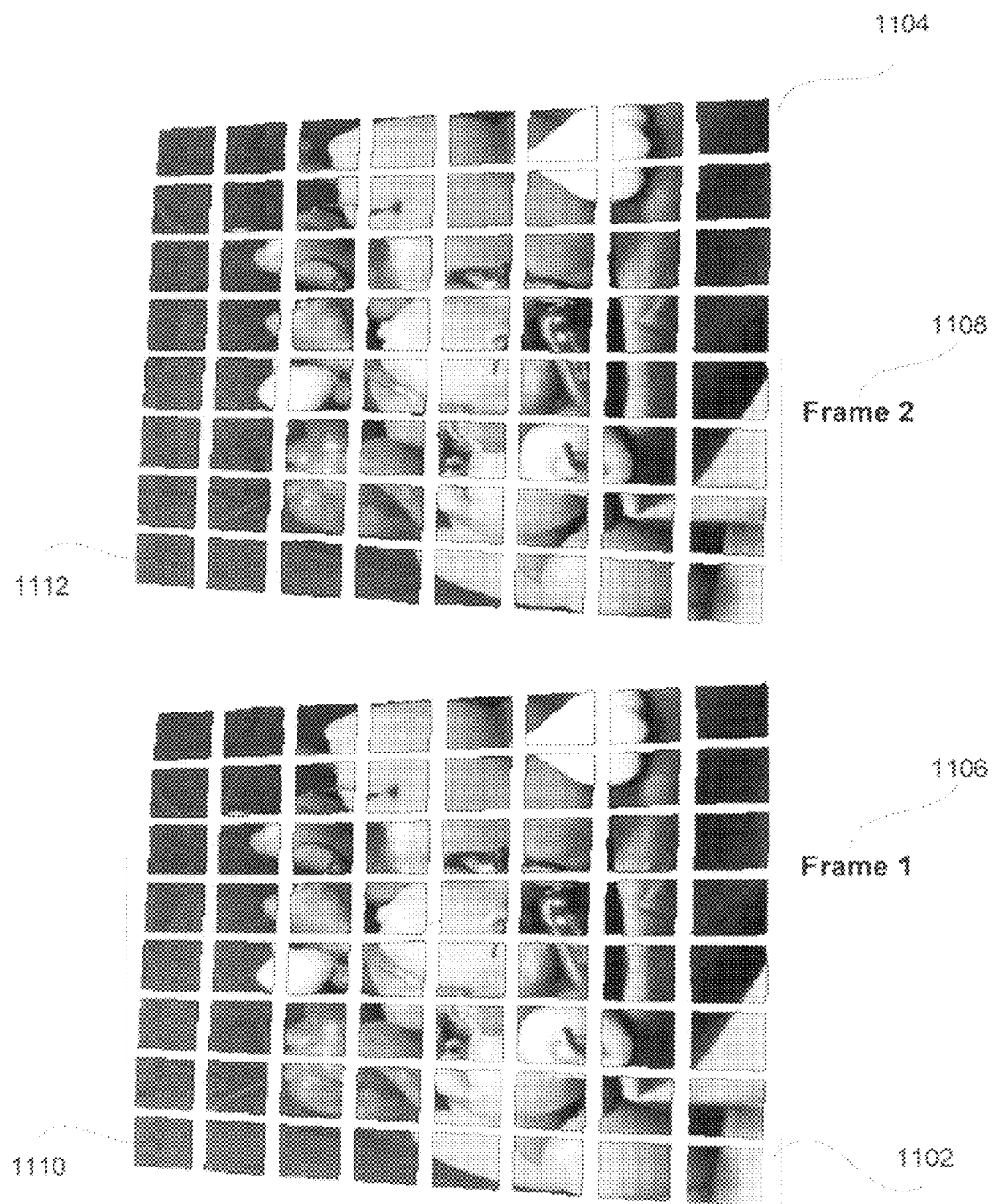
FIG. 11 illustrates an example of brightness self-correction.

FIG. 11 illustrates an example of brightness self-correction. Brightness self-correction is according to the fourth aspect of the present disclosure. Similar to the registration calibration self-correcting, in one embodiment of the present disclosure, the brightness calibration can be verified and corrected from the same sensor captured images used for registration calibration self-correcting function. After the temporal stacking and sensor capturing, the first captured sensor image 1102 is the result of the first sub-frame 1106 after projector stacking of the first sub-image and the second sub-image using the first projector stacking method; The second captured sensor image 1104 is the result of the second sub-frame 1108 after projector stacking of the second sub-image and the first sub-image using the second projector stacking method; Assuming the average peak brightness of the first projector is P, and the average peak brightness of the second projector is Q; now comparing a block 1110 in the first captured sensor image 1102 and a block 1112 in the second captured sensor image 1104 in display gamma decoded color space, if the mean value of the block 1110 is B1; the mean value of the block 1112 is B2; the mean value of the same block in the display gamma decoded first sub-image is L; and the mean value of the same block in the display gamma decoded second sub-image is H; then we have $LP+HQ=B1$ and $HP+LQ=B2$; the solution of P/Q is then $P/Q=(B1*L-B2*H)/(B2*L-B1*H)$.

In another embodiment of the present disclosure, brightness calibration and correction can also be done within one image. After the three-dimension spatial stacking and sensor capturing, assuming the average peak brightness of a block 104 of the first projector is P, and the average peak brightness of a block 106 of the second projector is Q; now comparing a block 104 in the first sub-region in the first captured sensor image and a block 106 in the second captured sensor image in the second sub-region in the same captured sensor image, all with the display gamma decoded color values; if the mean value of the block 104 is B1; the mean value of the block 106 is B2; the mean value of the block 104 in the display gamma decoded first sub-image is L1; and the mean value of the block 104 in the display gamma decoded second sub-image is H1; the mean value of the block 106 in the display gamma decoded first sub-image is L2; and the mean value of the block 106 in the display gamma decoded second sub-image is H2; then we have $L1P+H1Q=B1$ and $H2P+L2Q=B2$; the solution of P/Q is then $P/Q=(B2*H1-B1*H2)/(B1*L2-B2*L1)$.

From the calculated P/Q value, adjust either P or Q to make $P/Q=1$ for either intra-projector brightness uniformity or inter-projector brightness uniformity. After the correction, the processing repeats in real time to check and correct the resulting brightness non-uniformity. If the projectors brightness is perfectly uniform, the detected error should be 0 and the correction becomes 0 too.

Figure 12:
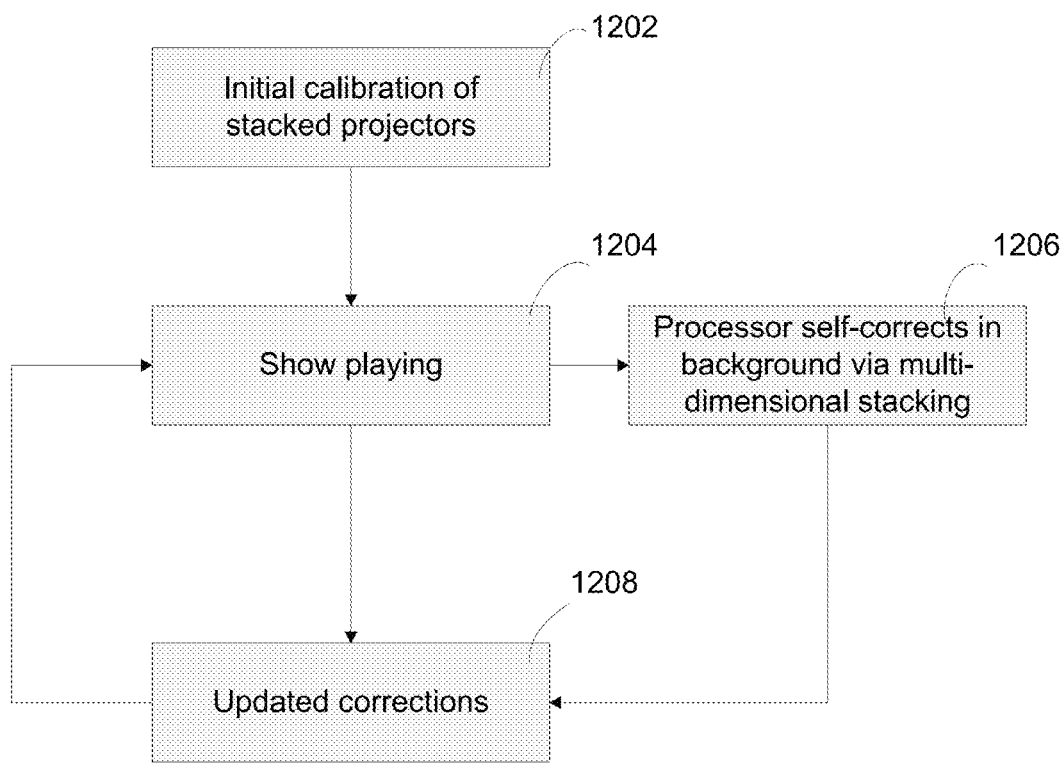
FIG. 12 illustrates a high level diagram of self-correcting via multi-dimensional stacking process flow.

FIG. 12 illustrates a high level diagram of one embodiment of the present disclosure for self-correcting via multi-dimensional stacking process flow from a user point of view. The stacked system is initially calibrated using the traditional calibration method using a sensor 1202. The initial registration mapping is established between projectors. The initial warping function is also derived and in place to use for show playing 1204. Due to the improved properties by multiple dimensional stacking of the present disclosure, this initial calibration is not required to be very accurate for the system to start to deliver high quality display image at this point. During the course of system usage for show playing or other image presentation, the processor in charge of conducting multi-dimensional stacking and calibration self-correcting feature 1206 is started and always running in the background, which is unnoticeable to users. If there are any internal or external factors that cause the system calibrations either in brightness uniformity or registration drifting or change, the self-correcting processor 1206 will detect the error or changes immediately based on the captured show images and make the appropriate correction to the calibrations 1208. The updated calibration parameters 1208 will be used by system 1204 immediately for the improved display quality before the users are even able to notice any difference.

Figure 13:
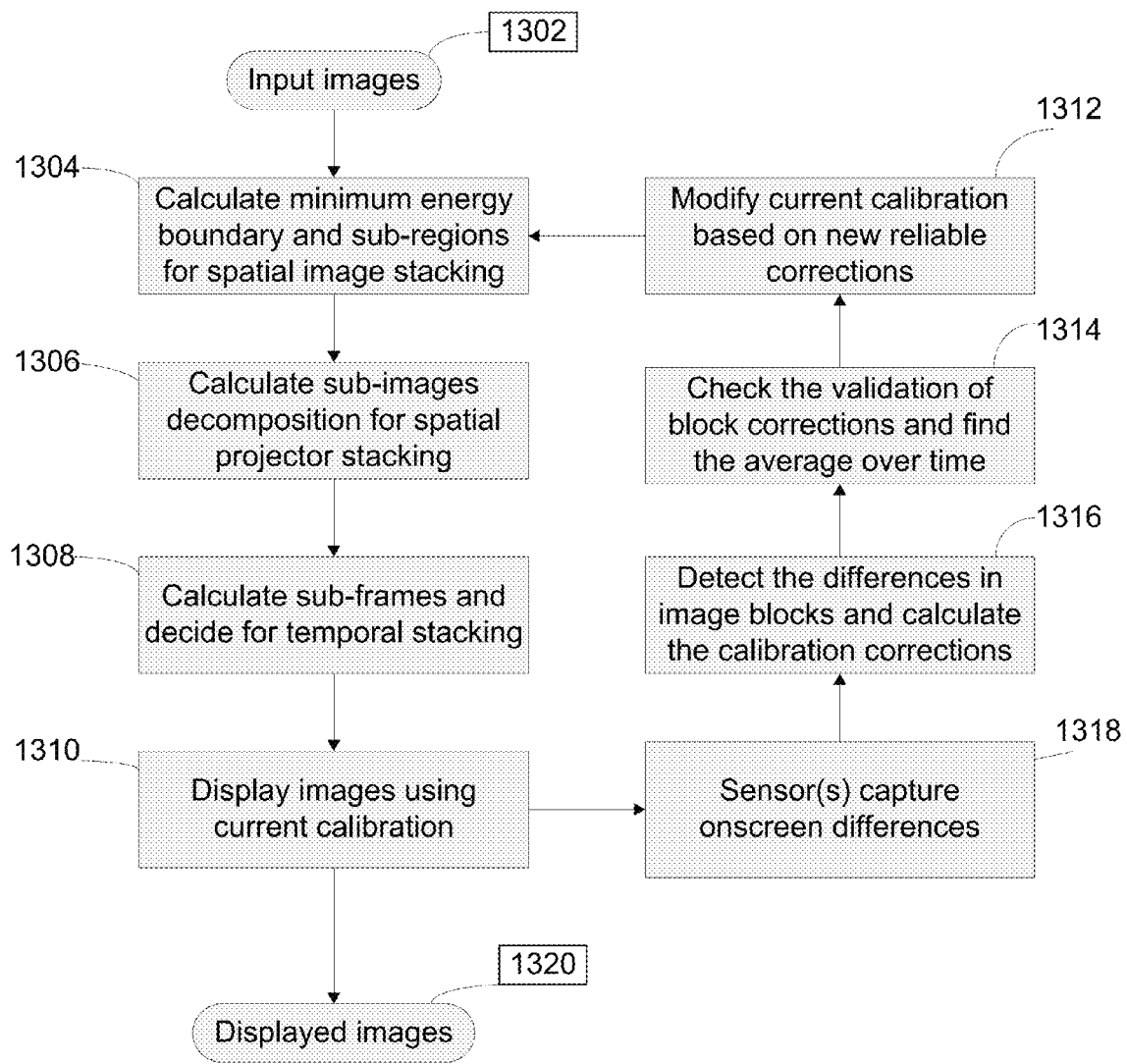
FIG. 13 illustrates a detailed processing diagram of self-correcting via multi-dimensional stacking projection.

FIG. 13 gives one example of a detailed processing diagram of self-correcting via multi-dimensional stacking projection. The process described here is for exemplary purpose and is not intended to limit the application to must include all presented components or steps, or in order. Other trivial variants can be easily constructed and used by those ordinary skilled in the art.

FIG. 13 extends and describes a possible processing internal of the negative feedback control module 1208 and part of 1204. The input images 1302 are provided and enter into the system; in block 1304 the system processor receives the input image, and analyzes the image and calculates the minimum energy boundaries; image sub-regions can then be determined for spatial image stacking. The system processor continues to calculate the sub-image decomposition for spatial projector stacking using the methods and criteria described earlier in box 1306. The processor continues to decide how to calculate the next sub-image to use in the temporal stacking or not to use temporal stacking at all by using the first of the many aspects from the image stacking of the first aspect of the present disclosure for self-correcting within single sub-frame in box 1308. In box 1310, system sends out the calculated image for display using the current calibration. At the same time of images are display for viewing in 1320, the displayed images are captured by sensors in box 1318; in background, the processor checks the captured image and detects the calibration difference, e.g. registration differences or brightness differences and estimates the appropriate corrections for each of image blocks by using the methods and criteria described earlier in box 1316. In some of the embodiments as described before, the registration or brightness correction vectors could be already conveniently estimated within the original input image domain, for example, through inverse warp mapping or display color transfer functions. However in other embodiments when the registration or brightness correction vectors are directly estimated in camera captured image domain, for example, a direct disparity comparison in a default setup in block 616 of FIG. 6 is used, an adaptive correction estimation scheme can be used without needing to know the accurate inverse warp mapping or display color transfer function. For example, the initial correction vector can be set to an arbitrary value or simply based on the previous values, because this is a closed negative feedback system, the next registration or brightness error will provide information on how good this initial estimation is; if it is too small resulting a remaining registration or brightness error in the same direction, the next correction can be set to be the same direction with an adaptive value based on how much the previous correction improves; if it is too large resulting an error in the opposite direction, the next correction can be set to be the opposite direction with an adaptive value based on how much the over-correction is. These learning results can be saved for future corrections to constantly improve the convergence speed and accuracy. The calculated the calibration corrections are then interpolated to all pixels and ready to be checked with validation or be averaged over time for robustness or reliability. The validation 1314 might include the block image content structure similarity check, feature disparity bi-direction double checking, or other temporal filtering or thresholding for protection against out-liners. For example, processor in box 1314 may calculate the content difference within each of image blocks from the two original source images of these two sub-frames. If the content of these two image blocks from the two original source images are exactly same or similar enough meeting a predefined the criteria, the registration differences or brightness differences and the calibration correction estimated in box 1318 may be tagged as valid. In box 1312, if a correction is decided, an update of current calibration based on the newly calculated reliable correction will be applied to the system for next image display. In one variant of system design of the present disclosure, the temporal stacking can be not used at all by using the first of the many aspects from the image stacking of the first aspect of the present disclosure for self-correcting within single sub-frame; if so then the system exits this diagram through 1420 in FIG. 14 and goes to box 1318 in FIG. 13. If not, the system processor checks the source images for the next sub-frame has enough similar content in image blocks compared to the previous sub-frame in box 1410. If the frames are same or similar (still or very slow motions), the system processor goes to box 1416 to calculate the next sub-frame by deriving sub-images. After the new sub-frame is calculated, the system displays the sub-frame for creating temporal stacking and fire the camera for capturing in box 1418. If the frames are too much different, the system processor can either exit this diagram through 1420 or goes to box 1412 to calculate sub-frame based on the last frame just displayed. In this choice of embodiment of the present disclosure, only single show frame is dropped and replaced with the duplication of the last frame. This choice can be configured to happen very rare during a relative long period of time, so it is still difficult for the audience to perceive, but it could achieve the best calibration error detection and self-correction. After the new sub-frame is calculated, the system displays the sub-frame for creating temporal stacking and fire the camera for capturing in box 1418.

Figure 14:
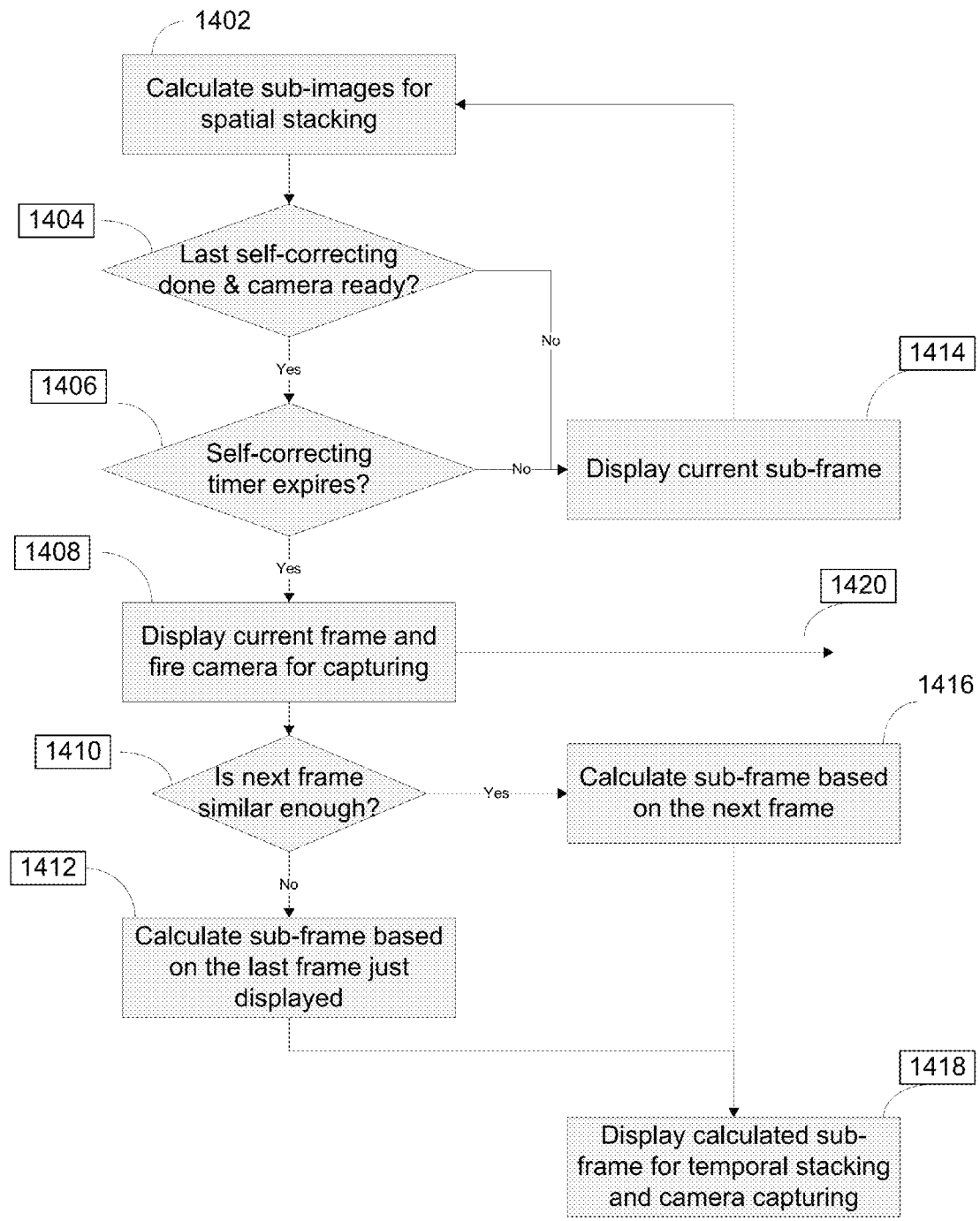
FIG. 14 illustrates a detailed processing diagram of sub-frame temporal stacking projection for self-correction.

FIG. 14 illustrates one embodiment of the present disclosure of the further detailed processing diagram of the box 1308 and 1310 and part of 1318. Right after the calculation of all the sub-image for the first sub-frame of spatial stacking in box 1402, the system processor checks if the last self-correcting calculation (box 1312, 1314, 1316, 1318) has been finished and the camera is ready for capturing the next frame in box 1404. If the checking result is false, the system does nothing more than just displaying the current sub-frame in box 1414. If the result is yes, the system processor checks a timer controlling how often the self-correcting function will be running in box 1406. If the timer has not expired, the system does nothing more than just displaying the current sub-frame in box 1414. If the timer expires, the system also displays the current sub-frame and fire the camera to capture the current frame in box 1408.

Figure 16:
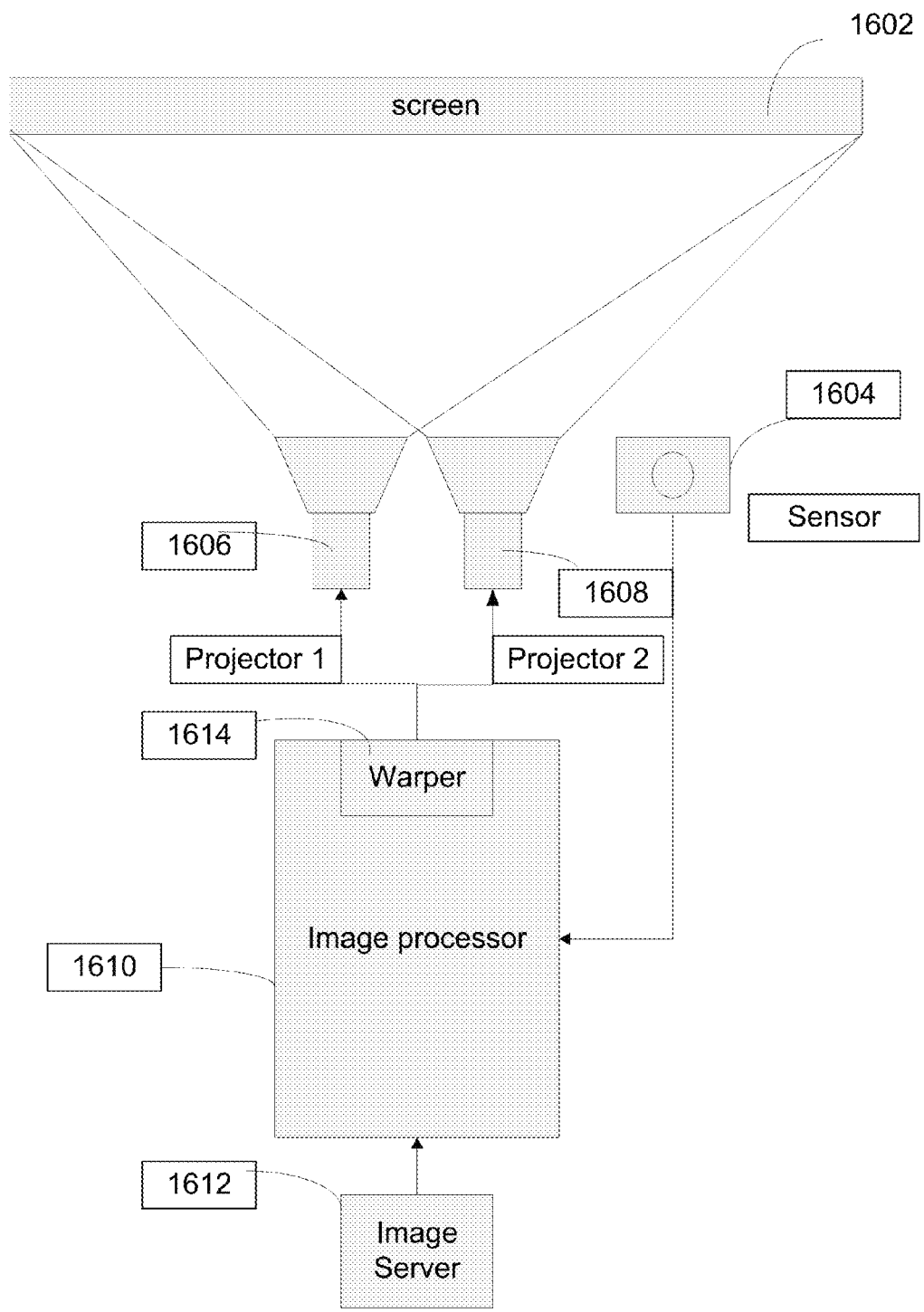
FIG. 16 illustrates a high level diagram of the system.

FIG. 16 illustrates a high level diagram of one embodiment of the system design of the present disclosure. Other variants of the system design by adding or removing certain components, for example, apply the same methods and designs to more than two projectors; apply the same methods and designs to other type of display devices, etc. or other obvious modifications to the ordinary skilled in the art. FIG. 16 is a dual projectors system comprising the first projector 1606 and the second projector 1608. Both projectors are displaying images onto system screen 1602. A general image processor module 1610 connects to both projectors 1606 and 1608 through a warping processor 1614. The warper 1614 has ability to warp the images sent to the first projector and/or the images sent to the second projector based on the processing described in FIG. 15 and the previous related description. A general image server module 1612 is in responsible to provide image feed to the image processor 1610. A general sensor 1604 is connected to the image processor 1610 as well. The sensor module 1604 is preferably a higher definition device for the better expected performance of the system. The center of image processor 1610 implements partial or most or all the processing or algorithms described in the present disclosure.

In another alternative embodiment of the present disclosure, two same image processors 1610 are used in the system as one image processor is normally idle as a backup in order to improve the system reliability. At time when the first image processor fails to work properly, the backup image processor can be switched on to replace the first failing image processor automatically or by human manual intervention.

Also in another alternative embodiment of the present disclosure, two image servers 1612 are used in the system as each image server providing image content to each target projector. For example, the first image server provides image content through image processor to the first projector; and the second image server provides image content through image processor to the second projector; if one image processor is used, the image processor will process both input image servers streams and send processed images to the first and second projectors respectively. If two image processors are used in this case, the first image processor may process the first input image server stream and send processed images to the first projector; while the second image processor may process the second input image server stream and send processed images to the second projector.

The invention claimed is:

1. A method for generating a plurality of sub-images from an input image, comprising:
   determining a number of projection devices N;
   partitioning the input image into a number of sub-regions within the input image, wherein the number of sub-regions is equal to the number of projection devices N;
   generating a number of sub-images from the input image, wherein the number of sub-images is equal to the number of projection devices N, each of the number of sub-images has a same number of pixels as the input image, each of the number of sub-images corresponds to one of the number of projection devices, and a partitioning of a number of sub-regions within each of the number of sub-images is identical to the partitioning of the number of sub-regions within the input image, wherein there is one and only one sub-region in all sub-regions of the i-th sub-image that has a higher frequency component than any other sub-regions in the i-th sub-image, i is from 1 to N, wherein there is one and only one sub-region in all j-th sub-regions of all the sub-images that has a higher frequency component than any other j-th sub-regions of all the sub-images, j is from 1 to N, wherein lower frequency components of the j-th sub-regions in all the sub-images overlap.

2. The method of claim 1, wherein the number of projection devices N is two, wherein the one and only one sub-region in all j-th sub-regions of all the sub-images that has a higher frequency component than any other j-th sub-regions in all the sub-images is the j-th sub-region of the j-th sub-image.

3. The method of claim 1, wherein the partitioning of sub-regions is determined by a soft boundary.

4. The method of claim 1, wherein the generating of sub-images from the input image is achieved by a spatial domain filtering or a frequency domain filtering using a wavelet transform or a nonlinear edge preserving filter.

5. The method of claim 1, wherein the generating of sub-images from the input image is achieved by remixing sub-regions after a spatial domain filtering or a frequency domain filtering.

6. A method for generating a first sub-frame and a first plurality of sub-images from a first input image and a second sub-frame and a second plurality of sub-images from a second input image for display system with a first projection device and a second projection device, the method comprising:

partitioning the first input image into two sub-regions within the first input image;

generating two sub-images from the first input image, wherein each of the two sub-images has a same number of pixels as the first input image, each of the two sub-images corresponds to one of the two projection devices, and a partitioning of two sub-regions within each of the two sub-images is identical to the partitioning of the two sub-regions within the first input image, wherein the one and only one sub-region in all i-th sub-regions of all the sub-images that has a higher frequency component than any other i-th sub-regions in all the sub-images is the i-th sub-region of the i-th sub-image; i is from 1 to 2, wherein lower frequency components of the i-th sub-regions in all the sub-images overlap;

partitioning the second input image into two sub-regions within the second input image, generating two sub-images from the second input image, wherein each of the two sub-images has a same number of pixels as the second input image, each of the two sub-images corresponds to one of the two projection devices, and a partitioning of two sub-regions within each of the two sub-images is identical to the partitioning of the two sub-regions within the second input image, wherein the one and only one sub-region in all i-th sub-regions of all the sub-images that has a higher frequency component than any other i-th sub-regions in all the sub-images is the i-th sub-region of the j-th sub-image, i is from 1 to 2 and i and j are different, wherein lower frequency components of the i-th sub-regions in all the sub-images overlap.

7. The method of claim 6, wherein at least one of the four sub-images is warped, wherein the first sub-images of the first input image and the second input image are transmitted to the first projection device, and the second sub-images of the first input image and the second input image are transmitted to the second projection device, wherein the first sub-image and second sub-image of the corresponding input image are superimposed on a screen.

8. The method of claim 7, wherein the superimposed sub-images on the screen resembles the input image.

9. The method of claim 6, further comprising:

transmitting the first sub-images to the first projection device;

transmitting the second sub-images to the second projection device;

displaying the first sub-frame by superimposing the first sub-image and the second sub-image of the first sub-frame, wherein the one and only one sub-region in all i-th sub-regions of all the sub-images that has a higher frequency component than any other i-th sub-regions in the all sub-image is the i-th sub-region of the i-th sub-image i is from 1 to 2.

10. The method of claim 9, further comprising:

capturing the displayed first sub-frame with an image sensor;

displaying the second sub-frame by superimposing the first sub-image and the second sub-image of the second sub-frame, wherein the one and only one sub-region in all i-th sub-regions of all the sub-images that has a higher frequency component than any other i-th sub-regions in all the sub-images is the i-th sub-region of the j-th sub-image, i is from 1 to 2 and i and j are different.

11. The method of claim 10, further comprising: capturing the displayed second sub-frame with the image sensor.

12. The method of claim 11, further comprising: comparing the captured first sub-frame and the captured second sub-frame.

13. The method of claim 12, further comprising: calculating a location or brightness difference of the corresponding higher frequency components between the captured first sub-frame and the captured second sub-frame.

14. The method of claim 13, further comprising:

calibrating projection devices by warping or adjusting brightness according to the calculated location or brightness difference.

15. The method of claim 9, further comprising: identifying at least a boundary separating at least a first sub-region and a second sub-region.

16. The method of claim 6, wherein the first input image is re-used in place of the second input image.

17. An image display system, comprising:

an image processing unit configured to generate at least two sub-images from an input image by:

generating a first sub-frame and a first plurality of sub-images from a first input image and a second sub-frame and a second plurality of sub-images from a second input image for display system with a first projection device and a second projection device, the method comprising:

partitioning the first input image into two sub-regions within the first input image;

generating two sub-images from the first input image, wherein each of the two sub-images has a same number of pixels as the first input image, each of the two sub-images corresponds to one of the two projection devices, and a partitioning of two sub-regions within each of the two sub-images is identical to the partitioning of the two sub-regions within the first input image, wherein the one and only one sub-region in all i-th sub-regions of all the sub-images that has a higher frequency component than any other i-th sub-regions in all the sub-images is the i-th sub-region of the i-th sub-image, i is from 1 to 2, wherein lower frequency components of the i-th sub-regions in all the sub-images overlap;

partitioning the second input image into two sub-regions within the second input image;

generating two sub-images from the second input image, wherein each of the two sub-images has a same number of pixels as the second input image, each of the two sub-images corresponds to one of the two projection devices, and a partitioning of two sub-regions within each of the two sub-images is identical to the partitioning of the two sub-regions within the second input image, wherein the one and only one sub-region in all i-th sub-regions of all the sub-images that has a higher frequency component than any other i-th sub-regions in all the sub-images is the i-th sub-region of the j-th sub-image, i is from 1 to 2 and i and j are different, wherein lower frequency components of the i-th sub-regions in all the sub-images overlap;

an image warper configured to update at least one of all the sub-images by warping;

a first display device for displaying the first sub-images on a display;

at least a second display device for displaying the second sub-images on the same display.

18. The image display system of claim 17, further comprising: an image sensor configured to capture at least two sub-images displayed on the screen.

19. The image display system of claim 18, further comprising:

a controller configured for displaying the first sub-image and the second sub-image of the first input image, capturing the first sub-image and the second sub-image of the first input image displayed on the screen using the image sensor, displaying a first sub-image and a second sub-image of the second input image, capturing the first sub-image and the second sub-image of the second input image displayed on the screen using the image sensor, and calculating a location or brightness difference of the corresponding higher frequency components between the captured first sub-frame and the captured second sub-frame.

20. The image display system of claim 19, wherein the control unit is further configured for:

calibrating projection devices by warping or adjusting brightness according to the calculated location or brightness difference.

* * * * *